(12) United States Patent
Ichieda

(10) Patent No.: US 8,806,074 B2
(45) Date of Patent: Aug. 12, 2014

(54) DISPLAY DEVICE, PROJECTOR, DISPLAY SYSTEM, AND METHOD OF SWITCHING DEVICE

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 13/710,854

(22) Filed: Dec. 11, 2012

(65) Prior Publication Data

US 2013/0179599 A1 Jul. 11, 2013

(30) Foreign Application Priority Data

Jan. 6, 2012 (JP) ................. 2012-001018

(51) Int. Cl.
 *G06F 3/00* (2006.01)
 *G09G 5/00* (2006.01)
 *G06F 3/033* (2013.01)
 *G06F 3/0488* (2013.01)

(52) U.S. Cl.
 CPC .............. *G06F 3/033* (2013.01); *G06F 3/0488* (2013.01)
 USPC ................................. 710/8; 710/14; 345/156

(58) Field of Classification Search
 None
 See application file for complete search history.

(56) References Cited

U.S. PATENT DOCUMENTS

| 8,190,782 | B2 | 5/2012 | Ichieda | |
|---|---|---|---|---|
| 8,190,785 | B2 * | 5/2012 | Hill et al. | 710/8 |
| 2002/0059478 | A1 | 5/2002 | Kadota | |
| 2010/0115145 | A1 * | 5/2010 | Banerjee et al. | 710/10 |
| 2013/0069870 | A1 * | 3/2013 | Ichieda | 345/157 |
| 2013/0093672 | A1 * | 4/2013 | Ichieda | 345/157 |
| 2013/0106908 | A1 * | 5/2013 | Ichieda | 345/629 |
| 2013/0162538 | A1 * | 6/2013 | Ichieda | 345/163 |
| 2013/0162607 | A1 * | 6/2013 | Ichieda | 345/204 |
| 2013/0176216 | A1 * | 7/2013 | Ichieda | 345/157 |

FOREIGN PATENT DOCUMENTS

JP 4272904 B 6/2009

* cited by examiner

*Primary Examiner* — Idriss N Alrobaye
*Assistant Examiner* — Richard B Franklin
(74) *Attorney, Agent, or Firm* — ALG Intellectual Property, LLC

(57) ABSTRACT

A display device is capable of switching a function of an indication body in accordance with the need of the user in the case in which the indication body is made to function as a pointing device. The display device is provided with a function device having a first interface. The configuration information of the first interface is stored in the storage section, and is supplied to a host device by a supply section via the function device. A change section is capable of change the configuration information in accordance with the operation of the user received by a reception section.

12 Claims, 9 Drawing Sheets

02

SELECTION OF NUMBER OF USERS

C21 ☑ ONE USER

C22 ☐ TWO USERS

DEVICE SELECTION

USER 1
C31 ☑ MOUSE DEVICE
C32 ☐ DIGITIZER DEVICE

USER 2
C33 ☐ MOUSE DEVICE
C34 ☑ DIGITIZER DEVICE

FIG. 13

DISPLAY DEVICE, PROJECTOR, DISPLAY SYSTEM, AND METHOD OF SWITCHING DEVICE

BACKGROUND

1. Technical Field

The present invention relates to a technology for recognizing an operation to a display surface.

2. Related Art

In the past, there has been known a device, which, when a specific position of an image displayed by a display device such as a projector is indicated with an indication body, detects the indication position, and then displays a pointer or the like so as to correspond to the position thus detected (see, e.g., Japanese Patent No. 4272904 (Document 1)). By drawing the trajectory of the position detected using the device described in Document 1, it is possible to display characters, figures, and so on written by hand.

Incidentally, in the case in which the user draws a handwritten image to the display surface, the information representing the indication position of an indication body used for handwriting is sometimes treated as the information representing the indication position or the like of a pointing device (e.g., a mouse and a digitizer). On this occasion, there can be the case in which the switching from the state of treating the information representing the indication position and so on of the indication body as the information representing the indication position and so on of a certain pointing device to the state of treating the information as the information representing the indication position and so on of another pointing device is desired. Further, in the case of using a personal computer (PC) as the host device, if the operating system (OS) of the PC or the version thereof is different, there is a possibility that available pointing devices are also different.

SUMMARY

An advantage of some aspects of the invention is to make it possible to switch the function of the indication body in accordance with the need of the user in the case in which the indication body is made to function as a pointing device.

A display device according to an aspect of the invention is configured to include a function device connected to a host device in a manner compliant with a USB (Universal Serial Bus) standard, and having a first interface, a storage section adapted to store a plurality of pieces of configuration information including first configuration information adapted to make a first pointing device correspond to an interface, a display section adapted to display an image on a display surface, a detector adapted to detect a first position indicated by a first indication body to the display surface, a supply section adapted to assign the first configuration information stored in the storage section and first coordinate data representing the first position detected by the detector to the first interface, and supply the host device with the first configuration information and the first coordinate data via the function device, a reception section adapted to receive an operation of a user, and a change section adapted to change the configuration information corresponding to the first coordinate data in accordance with the operation received by the reception section.

According to the display device of this aspect of the invention, it is possible to change the configuration information assigned to the first coordinate data in accordance with the operation of the user.

In a preferable aspect of the invention, the function device includes the first interface and a second interface, the storage section stores the first configuration information, and second configuration information adapted to assign a second pointing device different from the first pointing device to an interface, the change section changes the interface, to which the supply section supplies the first coordinate data, from the first interface to the second interface in accordance with the operation, and the supply section assigns the second configuration information and the first coordinate data to the second interface, and supply the host device with the second configuration information and the first coordinate data via the function device.

According to this preferable aspect of the invention, it is possible to change the configuration information assigned to the first coordinate data by switching the interface, and there is no need to change the configuration information itself.

In another preferable aspect of the invention, the function device includes the first interface and a second interface, the storage section stores the first configuration information, and second configuration information adapted to assign a second pointing device different from the first pointing device to an interface, the detector detects the first position, and a second position indicated by a second indication body to the display surface, the supply section assigns the first configuration information stored in the storage section and the first coordinate data representing the first position detected by the detector to the first interface and supplies the host device with the first configuration information and the first coordinate data via the function device, and assigns the second configuration information stored in the storage section and second coordinate data representing the second position detected by the detector to the second interface and supplies the host device with the second configuration information and the second coordinate data via the function device, and the change section changes at least either of the first configuration information and the second configuration information supplied from the supply section in accordance with the operation received by the reception section.

According to this preferable aspect of the invention, it is possible to change each of the first configuration information and the second configuration information in accordance with the operation of the user.

In still another preferable aspect of the invention, the change section changes the configuration information so that a class of a device assigned to the first interface from one of a mouse and a digitizer to the other.

According to this preferable aspect of the invention, it is possible to use the indication body as a mouse or a digitizer.

In yet another preferable aspect of the invention, the storage section stores the configuration information, which assigns HID (Human Interface Device) class to the first interface and the second interface.

According to this preferable aspect of the invention, it is possible to recognize a plurality of indication bodies without installing the dedicated device driver in the host device.

In this case, the storage section may store the configuration information, which assigns a sub-class corresponding to a mouse to the first interface, and assigns a sub-class corresponding to a digitizer to the second interface.

According to this preferable aspect of the invention, a plurality of indication bodies can be recognized as the pointing devices different from each other.

Alternatively, the storage section may store the configuration information, which assigns a sub-class corresponding to a mouse to the first interface and the second interface, or may store the configuration information, which assigns a sub-class corresponding to a digitizer to the first interface and the second interface.

A projector according to another aspect of the invention is configured to include a function device connected to a host device in a manner compliant with a USB standard, and having a first interface, a storage section adapted to store a plurality of pieces of configuration information including first configuration information adapted to make a first pointing device correspond to an interface, a display section adapted to display an image on a display surface by projecting light, a detector adapted to detect a first position indicated by a first indication body to the display surface, a supply section adapted to assign the first configuration information stored in the storage section and first coordinate data representing the first position detected by the detector to the first interface, and supply the host device with the first configuration information and the first coordinate data via the function device, a reception section adapted to receive an operation of a user, and a change section adapted to change the configuration information corresponding to the first coordinate data in accordance with the operation received by the reception section.

According to the projector of this aspect of the invention, it is possible to change the configuration information assigned to the first coordinate data in accordance with the operation of the user.

A display system according to still another aspect of the invention is configured to include the display device and the first indication body described above, and a host device including an execution section adapted to execute a process corresponding to the first position in accordance with the configuration information and the first coordinate data supplied via the function device.

According to the display system of this aspect of the invention, it is possible to change the configuration information assigned to the first coordinate data in accordance with the operation of the user.

In a preferable aspect of the invention, the execution section executes a process of making the display section draw an image corresponding to the first position.

According to this preferable aspect of the invention, it is possible to reflect the indication by the indication body on the display by the display device.

A method of switching a device according to yet another aspect of the invention is a method of switching a device in a display device. The display device includes a function device connected to a host device in a manner compliant with a USB standard, and having a first interface, a storage section adapted to store a plurality of pieces of configuration information including first configuration information adapted to make a first pointing device correspond to an interface, and a display section adapted to display an image on a display surface. The method includes a first step of detecting a position indicated by an indication body to the display surface, a second step of assigning coordinate data representing the position detected in the first step and the configuration information stored in the storage section to the first interface, and supplying the host device with the coordinate data and the configuration information via the function device, a third step of receiving an operation of changing the configuration information, which is assigned to the first interface, from a user, a fourth step of changing the configuration information corresponding to the coordinate data from the coordinate data supplied in second step in accordance with the operation received in the third step, a fifth step of detecting, after the change in fourth step, a position indicated by the indication body to the display surface, and a sixth step of assigning coordinate data representing the position detected in the fifth step and the configuration information changed in fourth step to the first interface, and supplying the host device with the coordinate data and the configuration information via the function device.

According to the switching method of this aspect of the invention, it is possible to change the configuration information assigned to the coordinate data in accordance with the operation of the user.

BRIEF DESCRIPTION OF THE DRAWINGS

The invention will be described with reference to the accompanying drawings, wherein like numbers reference like elements.

FIG. 12 is a diagram for exemplifying an OSD image.

FIG. 13 is a diagram for exemplifying an OSD image.

DESCRIPTION OF AN EXEMPLARY EMBODIMENT

Overview of Invention

One feature of the invention resides in making it possible for the user to switch the function of an indication body in a display system capable of performing the process corresponding to the indication on the display surface made by the user using the indication body. Here, the function of the indication body denotes the function recognized in the host device. With the display system according to the invention, it is possible for the user to make the indication body function as a mouse or function as a digitizer according to the need while using the same indication body. It is assumed that the display system according to the invention performs the connection between a host device and a display device in a manner compliant with the USB standard in the configuration provided with the display device for displaying one or a plurality of indication bodies and an image, and detecting the position indicated by the indication body, and the host device for performing the process corresponding to the indication by the indication body.

It should be noted that in the invention use of a plurality of indication bodies by a single user is not excluded. However, for the sake of convenience of explanation, it is assumed hereinafter that a single user uses one indication body, and further, the number of users performing indication to the display surface is two. In other words, a display system in which two users use one indication body for each, totally two indication bodies will hereinafter be explained.

Figure 1:
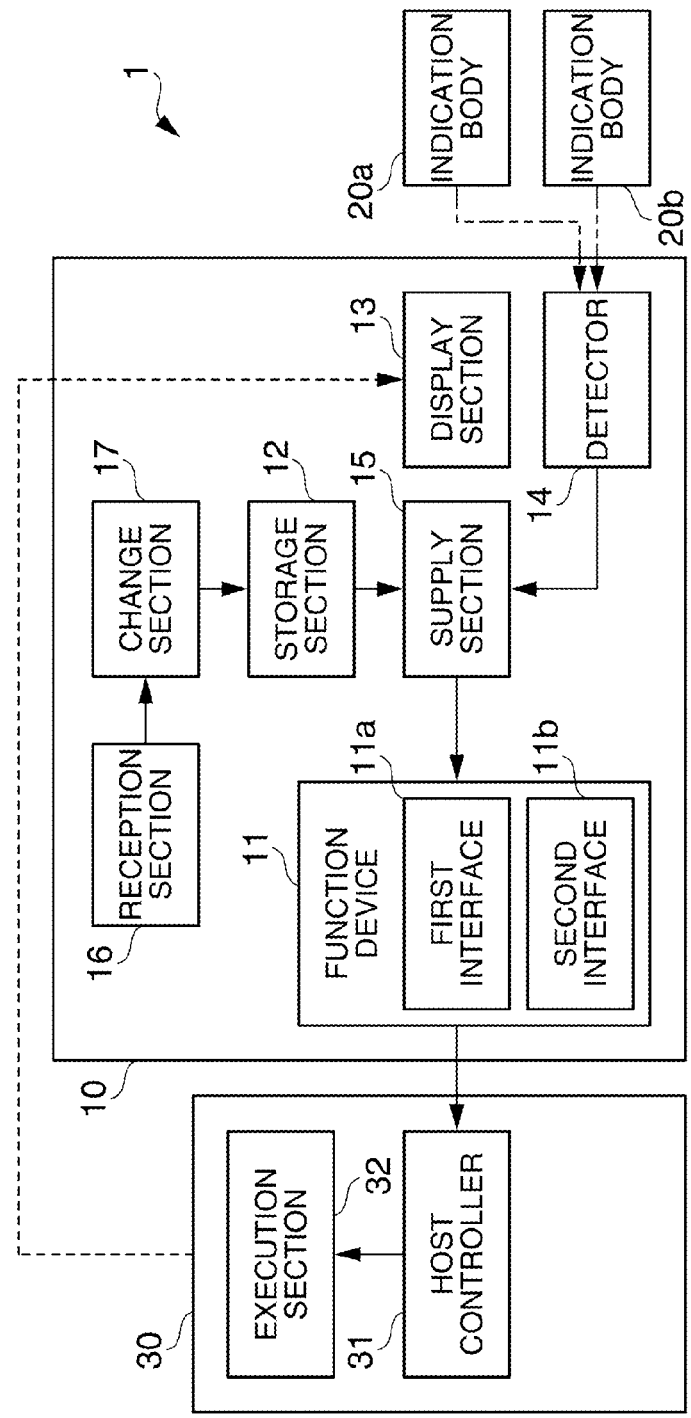
FIG. 1 is a block diagram showing a functional configuration of a display system.

FIG. 1 is a block diagram showing a functional configuration of a display system 1 according to an embodiment of the invention. The display system 1 is provided at least with a display device 10, indication bodies 20a, 20b, and a host device 30. The display device 10 can be a device provided with the constituents shown in FIG. 1 integrally (i.e., in a single device), or a device realizing the constituents by cooperative operations of a plurality of devices.

The display device 10 is provided with a function device 11, a storage section 12, a display section 13, a detector 14, a supply section 15, a reception section 16, and a change section 17. Further, the host device 30 is provided with a host controller 31, and an execution section 32. The host controller 31 and the function device 11 are connected to each other via, for example, a USB cable, but can also be connected in a wireless manner via wireless USB or the like.

The function device 11 is a device for connecting the display device 10 to the host device 30. The function device 11 is configured so as to be compliant with the USB standard, and has a first interface 11a and a second interface 11b. The first interface 11a and the second interface 11b are each configured including one or more endpoints. In other words, the function device 11 is a so-called composite device.

The storage section 12 is a device for storing configuration information. Here, the configuration information is the data (descriptor) for defining the configuration of the function device 11, and represents what class of device the host device 30 recognizes the function device 11 as. The configuration information is the information for providing the interfaces with correspondence with predetermined pointing devices. The class assigned to the first interface 11a and the second interface 11b is preferably the human interface device (HID) class, which is a general-purpose class, but can be a unique class defined by a vendor or the like. The configuration information of the embodiment of the invention includes the information representing the subclass (e.g., a mouse and a digitizer) besides the information representing the class. In the case of the HID class, the configuration information is described by a report descriptor. For example, in the configuration information of the mouse, the Usage Page is "Generic Desktop Page (0X01)," and in the configuration information of the digitizer, the Usage Page is "Digitizers (0X0D)."

The display section 13 is a device for displaying the image on the display surface. The display section 13 can be a device such as a liquid crystal display or an organic electroluminescence (EL) display provided with the display surface itself, or can be a device such as a projector using a screen, a wall surface, and so on as the display surface, and displaying an image by projecting light on the display surface.

The detector 14 is a device for detecting the position at which the user has performed indication to the display surface with the indication bodies 20a, 20b. The detector 14 optically detects or magnetically detects the indication by the indication bodies 20a, 20b, but the detection method itself is not particularly limited. The detector 14 outputs coordinate data representing the position thus detected. It should be noted that the indication bodies 20a, 20b are tools for the user to point the display surface, and are each, for example, a rod like tool imitating a writing material. However, the indication bodies 20a, 20b can each take any specific shape providing the indication bodies can point the display surface. One of the indication bodies 20a, 20b corresponds to a first indication body according to the invention, and the other thereof corresponds to a second indication body according to the invention.

It is also possible for the detector 14 to further have a function of discriminating the indication bodies 20a, 20b indicating the positions in addition to the function of detecting the positions indicated by the indication bodies 20a, 20b. For example, in the case of the configuration in which the indication bodies 20a, 20b emit light and then the detector 14 detects the light, it is possible to discriminate the indication bodies 20a, 20b from each other based on the colors (i.e., the wavelengths) of the light emitted by the indication bodies 20a, 20b or the illumination patterns (the timing of blinking) thereof.

The detector 14 can detect the plurality of positions indicated by the indication bodies 20a, 20b, respectively, and then output them as separate coordinate data. Here, the coordinate data representing the positions indicated by the indication bodies 20a, 20b are referred to as "first coordinate data" and "second coordinate data," respectively. If the detector 14 can discriminate the indication bodies 20a, 20b from each other, it is possible to make the first coordinate data and the second coordinate data have correspondence with the specific indication bodies in such a manner that, for example, the first coordinate data corresponds to the position indicated by the indication body 20a, and the second coordinate data corresponds to the position indicated by the indication body 20b.

The supply section 15 is a device for supplying the host device 30 with data via the function device 11. The supply section 15 supplies the configuration information in the process of enumeration, and then supplies the coordinate data. Specifically, the supply section 15 assigns the first coordinate data to the first interface 11a, and at the same time, assigns the second coordinate data to the second interface 11b, and then supplies the respective data.

The reception section 16 is a device for receiving the operation of the user. It is also possible for the reception section 16 to have a configuration of receiving the operation of the user via a button provided to the display device 10, or to have a configuration provided with a receiver section for receiving a wireless signal (e.g., an infrared signal) and for receiving the operation of the user via a remote controller for emitting the wireless signal. Further, it is also possible for the reception section 16 to have a configuration of receiving the indication by the indication bodies 20a, 20b to a part of the on-screen display (OSD) image described later as the operation of the user.

The change section 17 is a device for changing the configuration information supplied by the supply section 15. When the reception section 16 receives the operation of the user, the change section 17 changes the configuration information in accordance with the operation. The configuration information supplied by the supply section 15 to the host device 30 is determined in advance. Although the change section 17 changes at least one of the configuration information respectively assigned to the first interface 11a and the second interface 11b, it is also possible for the change section 17 to change the both at the same time.

The host controller 31 is a device for connecting the host device 30 to the display device 10. The host controller 31 is configured in a manner compliant with the USB standard.

The execution section 32 is a device for performing the process corresponding to the position detected by the detector 14. The execution section 32 is capable of identifying the first coordinate data assigned to the first interface 11a and the second coordinate data assigned to the second interface 11b, and then performing the processes corresponding to the respective coordinate data. The process performed by the execution section 32 is different in accordance with the position detected by the detector 14 and the image displayed at the position by the display device 10, but is, for example, for changing the image displayed on the display surface, or for controlling the operation of the display device 10 in accordance with the indication to the menu bar described later. The processes performed by the execution section 32 include a process of drawing a pointer or a hand-written image, and a process for receiving a change in the configuration information.

Configuration of Embodiment

Figure 2:
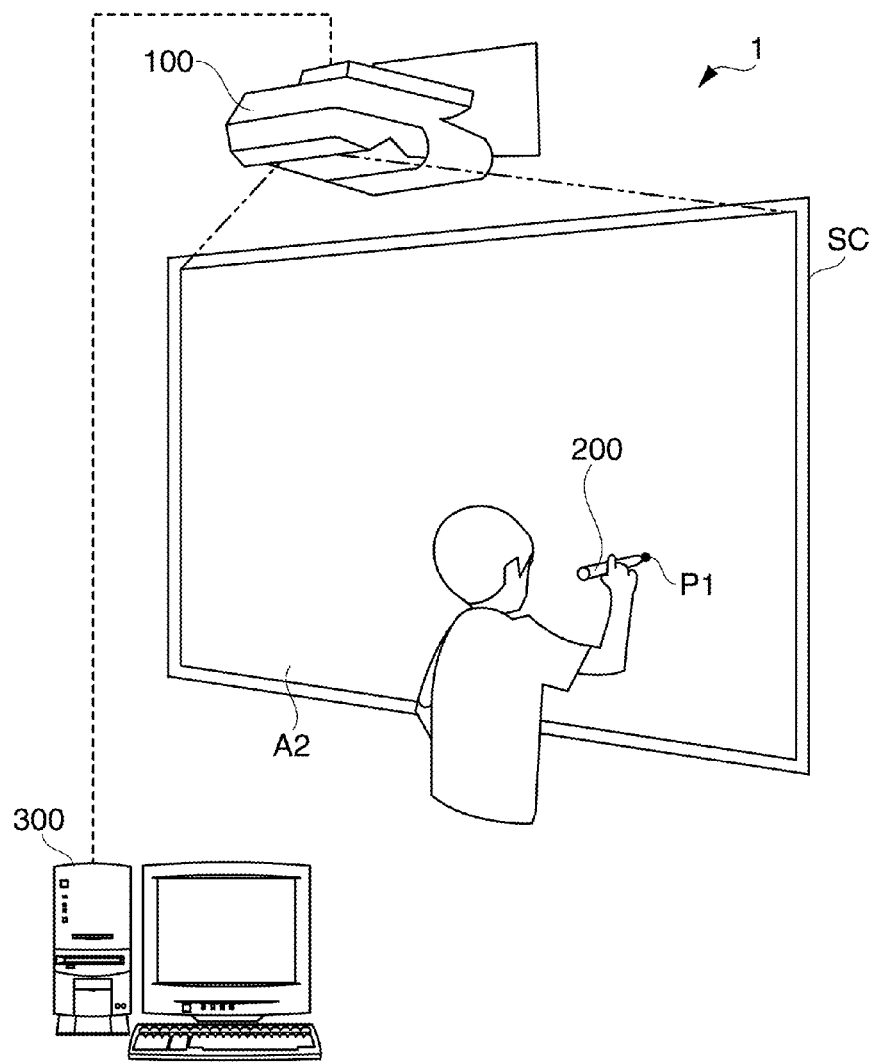
FIG. 2 is a diagram showing a configuration of the display system.

FIG. 2 is a diagram showing a configuration of an example of the display system 1 described above as a specific embodiment of the invention.

The projector 100 is connected to a personal computer (PC) 300 as the information processing device via an image signal cable or the like in a wired manner. The image data is input from the PC 300 to the projector 100, and the projector 100 projects an image on the screen SC as a projection surface (the display surface) based on the image data thus input. Further, the projector 100 is connected to the PC 300 with the USB cable or the like, and transmits/receives the control data and so on to/from the PC 300. The projector 100 can perform projection irrespective of whether the image data input from the PC 300 is a still image or a moving image. It is also possible for the projector 100 to use the wall surface itself as the screen SC besides a flat plate fixed to the wall surface. Here, the range in which the image is projected on the screen SC is defined as an actual projection area A12 (a displayable area).

Here, the projector 100 corresponds to an example of the display device 10 shown in FIG. 1. Further, the PC 300 corresponds to an example of the host device 30 shown in FIG. 1, and a pen 200 corresponds to an example of the indication bodies 20a, 20b shown in FIG. 1. It should be noted that although the pen 200 alone is shown in FIG. 2, it is assumed that two or more pens 200 actually exist correspond respectively to two or more users. It is assumed in the present embodiment that the number of users is two at most.

In the display system 1, the user can perform the operation (position indication operation) of indicating an arbitrary position in the actual projection area A12 of the screen SC with the pen 200 in the hand by a handwriting operation during the projection of the image by the projector 100. The pen 200 is an operation device having a pen-like shape or a rod shape, and is used for indicating an arbitrary position on the screen SC. The projector 100 has a function of detecting the position indicated by the pen 200 as described later, and outputs coordinate data (coordinate information) representing the coordinate of the position thus detected to the PC 300.

It should be noted here that "handwriting" means that characters and figures can be drawn as if the user actually writes them with a writing material in accordance with the indication with the indication body, but does not mean that the user actually draws the characters and figures on the display surface while coloring them with color materials such as ink. It should be noted that hereinafter the characters and figures drawn by the user on the display surface are also referred collectively to "symbols." The symbols mentioned here can include numbers, signs, scientific symbols, and so on besides characters of a variety of languages. Further, figures include dots and lines besides circles and polygons.

Figure 3:
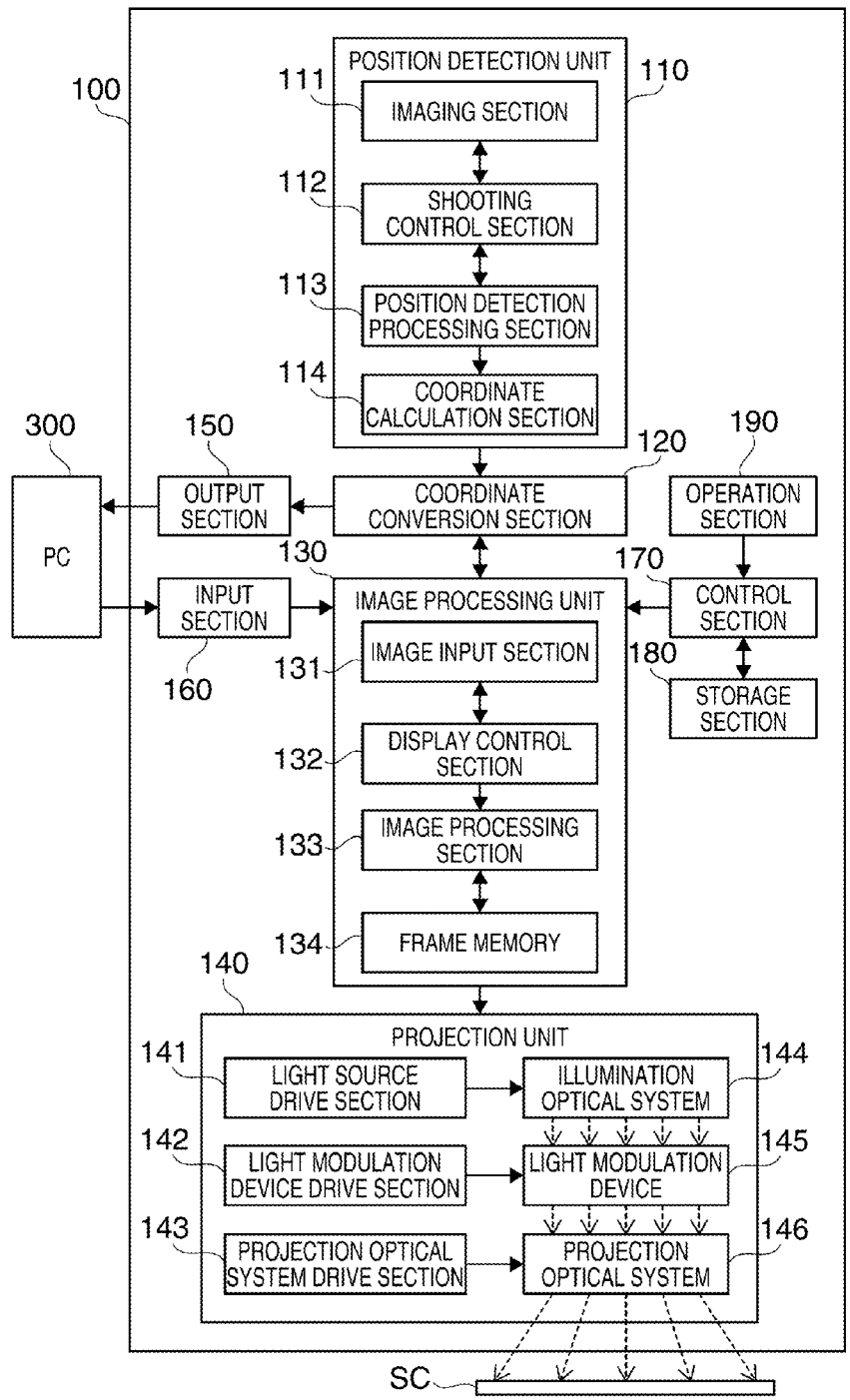
FIG. 3 is a block diagram showing a configuration of a projector.

FIG. 3 is a block diagram showing a configuration of the projector 100.

According to a rough classification, the projector 100 is provided with a position detection unit 110 for detecting the indication position of the pen 200 on the screen SC, a coordinate conversion section 120 for converting the coordinate of the indication position detected by the position detection unit 110 into the coordinate in the image data, an image processing unit 130 for performing image processing for display based on the image data input from the PC 300, a projection unit 140 for projecting the image on the screen SC in accordance with the control of the image processing unit 130, an output section 150 for outputting the coordinate thus converted into by the coordinate conversion section 120, an input section 160, a control section 170 for controlling each of these constituents, a storage section 180, and an operation section 190 for receiving operations by the user.

The control section 170 is composed of a central processing unit (CPU), a nonvolatile memory, a random access memory (RAM), and so on not shown, and reads out and then executes a control program stored in the storage section 180 connected to the control section 170 to thereby control each section of the projector 100. Further, by executing the control program stored in the storage section 180, the control section 170 performs a calibration described later. The control section 170 performs the calibration described to thereby obtain parameters (coordinate conversion parameters) representing the correspondence relationship between the coordinate in shot image data and the coordinate in the area (e.g., the actual projection area A12) on the screen SC to be the object of the calibration. The storage section 180 is formed of a magnetic or optical recording device, or a semiconductor storage element, and stores a variety of types of programs including the control program, and data such as various setting values.

The operation section 190 is connected to the control section 170. The operation section 190 is provided with a variety of switches and indicator lamps, and can also be provided with an operation panel disposed on an exterior housing (not shown) of the projector 100, or can also be provided with a receiving section for receiving an infrared signal from a so-called remote controller. The control section 170 appropriately lights or blinks the indicator lamps in accordance with the operation state and the setting state of the projector 100. Further, when the switch of the operation section 190 is operated, the operation signal corresponding to the switch thus operated is output to the control section 170. It should be noted that the operation section 190 is not limited to the infrared signal, but can also have a configuration of receiving other wireless signals. The operation section 190 corresponds to the reception section 16 shown in FIG. 1.

Further, in the case in which the display system 1 includes the remote controller, the projector 100 receives the infrared signal, which the remote controller (not shown) used by the user of the projector 100 transmits in accordance with the button operation. The operation section 190 receives the infrared signal received from the remote controller with a light receiving element, and then outputs an operation signal corresponding to this signal to the control section 170. It should be noted that it is also possible to transmit an operation signal representing the operation with respect to the projector 100 from the PC 300 to the projector 100 to thereby control the projector 100 based on the operation signal. In this case, the PC 300 also functions as the operation section for the user to input the operation with respect to the projector 100.

The control section 170 detects the operation of the user based on the operation signal input from the operation section 190, and then controls the projector 100 in accordance with this operation. For example, based on the operation signal input from the operation section 190, the control section 170 changes the configuration information assigned to the first interface 11a and the second interface 11b. In other words, the control section 170 corresponds to the change section 17 shown in FIG. 1.

The input section 160 is an interface for connecting the projector 100 to the PC 300. The input section 160 is an interface for inputting image data, and there can be used therefor a general-purpose interface such as an interface to which a digital video signal is input such as a DVI (Digital Visual Interface), a USB (Universal Serial Bus) interface, or a LAN (Local Area Network) interface, the S-video terminal to which the video signal such as NTSC (National Television System Committee), PAL (Phase Alternating Line), and SECAM (Sequentiel couleur a memoire), an RCA terminal to which a composite video signal is input, a D-terminal to which a component video signal is input, or an HDMI (High-Definition Multimedia Interface, a registered trademark) connector compliant with the HDMI standard. Further, it is also possible to adopt a configuration in which the input section 160 has an A/D conversion circuit for converting an analog video signal into digital image data, and is connected to the PC 300 with an analog video terminal such as a VGA (Video Graphics Array) terminal. It should be noted that it is also possible for the input section 160 to perform transmission/reception of the image signal using wired communication, or to perform transmission/reception of the image signal using wireless communication.

Further, the input section 160 can also have a configuration provided with a DisplayPort developed by the Video Electronics Standard Association (VESA), and specifically, it can also have a configuration provided with a DisplayPort connector or a Mini-DisplayPort connector, and an interface circuit compliant with the DisplayPort standard. In this case, the projector 100 can be connected to the DisplayPort provided to the PC 300 or a portable device having an equivalent function to the PC 300.

The configuration of the projector 100 is classified into an optical system for performing optical image formation and an image processing system for electrically processing the image signal. The optical system is composed of an illumination optical system 144, a light modulation device 145, and a projection optical system 146. The illumination optical system 144 is provided with a light source formed of a xenon lamp, a super-high pressure mercury lamp, a light emitting diode (LED), a laser, or the like. Further, the illumination optical system 144 can also be provided with a reflector and an auxiliary reflector for guiding the light emitted by the light source to the light modulation device 145, and can be a system provided with, for example, a lens group for improving the optical characteristics of the projection light, a polarization plate, or a photochromic element for reducing the light intensity of the light emitted by the light source on the path leading to the light modulation device 145.

The light modulation device 145 receives the signal from the image processing system described later, and then modulates the light from the illumination optical system 144. In the present embodiment, the explanation will be presented citing the case of configuring the light modulation device 145 using a transmissive liquid crystal panel as an example. In this configuration, the light modulation device 145 is composed of three liquid crystal panels corresponding respectively to the three primary colors of red (R), green (G), and blue (B) in order to perform color projection. The liquid crystal panels each have a predetermined number of pixels arranged, for example, vertically and horizontally in a matrix. The light from the illumination optical system 144 is separated into colored lights of three colors of RGB, and the colored lights enter the corresponding liquid crystal panels, respectively. The colored lights modulated while passing through the respective liquid crystal panels are combined by a combining optical system such as a cross dichroic prism, and are then output to the projection optical system 146.

The projection optical system 146 is provided with, for example, a zoom lens for performing expansion and contraction of the image to be projected and adjustment of the focus, a zoom controlling motor for controlling the level of the zoom, and a focus adjusting motor for performing the focus adjustment.

The projection unit 140 is provided with a projection optical system drive section 143 for driving the motors provided to the projection optical system 146 in accordance with the control by the display control section 132, a light modulation device drive section 142 for driving the light modulation device 145 based on the image signal output from the display control section 132, and a light source drive section 141 for driving the light source provided to the illumination optical system 144 in accordance with the control by the control section 170. The projection unit 140 corresponds to the display section 13 shown in FIG. 1.

On the other hand, the image processing system is formed of the image processing unit 130 for processing the image data in accordance with the control by the control section 170 for integrally controlling the whole of the projector 100. The image processing unit 130 is provided with an image input section 131 for inputting the image data from the input section 160, the display control section 132 for processing the image data input via the image input section 131, and an image processing section 133 for developing the image on a frame memory 134 in accordance with the control of the display control section 132 to thereby generate the image to be projected by the projection section 30.

The display control section 132 performs discrimination of the format (the frame rate, the resolution, and the compression state) of the image data input via the image input section 131, and so on to thereby determine the necessary process for displaying the display image on the light modulation device 145, and then controls the image processing section 133 to perform the process. The image processing section 133 develops the image data, which is input via the image input section 131, on the frame memory 134 in accordance with the control of the display control section 132, then performs various conversion processes such as interlace/progressive conversion, or resolution conversion if necessary to thereby generate the image signal with a predetermined format for displaying the display image drawn on the frame memory 134, and then outputs it to the display control section 132. It should be noted that the projector 100 can also perform the display after changing the resolution and the aspect ratio of the image data thus input, or perform the display while keeping the resolution and the aspect ratio of the image data thus input in a dot-by-dot manner. Further, the image processing section 133 can perform various types of image processing such as a keystone correction, a color compensation corresponding to a color mode, and image expansion/contraction process in accordance with the control of the display control section 132. The display control section 132 outputs the image signal processed by the image processing section 133 to the light modulation device drive section 142 to display it on the light modulation device 145. Further, the image processing section 133 obtains the image position information based on the information such as the resolution and the aspect ratio of the image data presently displayed, and the display size in the liquid crystal panel of the light modulation device 145, and then outputs the image position information thus obtained to the coordinate conversion section 120. The image position information is the information representing what position in the actual projection area A12 the display image is projected (displayed) at. In other words, the image position information is the information related to the location of the display image in the actual projection area A12, and represents the position (location) of the display image in the actual projection area A12. The image position information varies in the case (e.g., the case in which the setting with respect to the resolution is changed in the PC 300) in which, for example, the resolution of the image data output by the PC 300 to the projector 100 is varied due to the variation in the display resolution of the PC 300.

The control section 170 performs the control program to thereby control the display control section 132 to execute the keystone correction of the display image imaged on the screen SC. Further, the control section 170 controls the display control section 132 to execute the expansion/contraction processes of the display image based on the operation signal input from the operation section 190.

The projector 100 has the position detection unit 110 for detecting the indication position indicated by the pen 200 on the screen SC. The position detection unit 110 is provided with an imaging section 111 for shooting the screen SC, a shooting control section 112 for controlling the imaging section 111, and a position detection processing section 113 for detecting the indication position of the pen 200 based on the shot image of the imaging section 111, and a coordinate calculation section 114 for calculating the coordinate of the indication position. The position detection unit 110 corresponds to the detector 14 shown in FIG. 1.

The imaging section 111 is a digital camera for shooting a field angle including maximum range (corresponding to the projection-allowable area A11 described later) in which the projection section 30 can project an image on the screen SC, and performs shooting in accordance with the control of the shooting control section 112, and then outputs the shot image data. In other words, the imaging section 111 is set to be able to shoot the range including the entire projection-allowable area A11. The imaging section 111 can always shoot the display surface, and can also perform shooting at only the necessary timing in accordance with the control by the control section 170. The shooting control section 112 controls the imaging section 111 to perform shooting in accordance with the control of the control section 170. In the case in which the imaging section 111 has a mechanism for adjusting the zoom magnification, the focus, and the aperture in the shooting operation, the shooting control section 112 controls the mechanism to perform shooting on the conditions set previously. After the shooting operation, the shooting control section 112 obtains the shot image data output by the imaging section 111, and then outputs it to the position detection processing section 113. The shot image data output from the imaging section 111 can also be the data expressed in the form such as RGB or YUV, or can also be the data representing only the luminance component. Further, the shooting control section 112 can also output the shot image data, which is output from the imaging section 111, to the position detection processing section 113 without conversion, or can also output it to the position detection processing section 113 after performing the adjustment of the resolution or the conversion into a predetermined file format (e.g., JPEG and BMP).

It should be noted that the imaging section 111 can also has a configuration capable of imaging the visible light, or a configuration capable of imaging the non-visible light (e.g., infrared light). In the case in which the imaging section 111 can image the non-visible light, it is possible to adopt, for example, the configuration in which the pen 200 emits the non-visible light, and the imaging section 111 images the non-visible light emitted from the pen 200, and the configuration in which the pen 200 includes a reflecting section capable of reflecting the non-visible light, the non-visible light is projected from the projector 100 toward the screen SC in accordance the control of the control section 170, and then the non-visible light reflected by the reflecting section of the pen 200 is imaged by the imaging section 111.

The position detection processing section 113 analyzes the shot image data input from the shooting control section 112 to thereby extract the boundary between the outside of the actual projection area A12 and the actual projection area A12 and the image of the pen 200 from the shot image data, and then identifies the indication position of the pen 200. The indication position of the pen 200 corresponds to, for example, a position of the tip of the pen 200. The position detection processing section 113 obtains the coordinate of the indication position thus detected, in the actual projection area A12.

The coordinate calculation section 114 performs the calculation of the coordinate based on the indication position of the pen 200 detected by the position detection processing section 113 and the coordinate conversion parameters. Specifically, the coordinate calculation section 114 obtains the coordinate of the indication position in the actual projection area A12, detected by the position detection processing section 113, and then outputs the control data representing the coordinate thus calculated to the coordinate conversion section 120. It should be noted that in the following explanation, the data (the coordinate information) representing the coordinate of the indication position of the pen 200 is referred to as "coordinate data," or simply as a "coordinate" in some cases.

The coordinate conversion section 120 converts the coordinate data output by the position detection unit 110 into the coordinate data representing the coordinate in the image data to be input by the PC 300 to the projector 100. The coordinate output by the position detection processing section 113 represents the coordinate detected based on the shot image data of the imaging section 111, and the coordinate can be expressed by the coordinate in the coordinate axes virtually provided on the screen SC. However, the correspondence relationship between the coordinate on the screen SC and the coordinate on the shot image data is affected by a variety of factors such as the distance between the projector 100 and the screen SC, the zoom magnification in the projection optical system 146, the installation angle of the projector 100, and the distance between the imaging device 5 and the screen SC. Therefore, in the projector 100, the calibration is performed to thereby obtain the coordinate conversion parameters representing the correspondence relationship between the coordinate in the shot image data and the coordinate in the area on the screen SC to be the object of the calibration.

If the coordinate conversion parameters are obtained by the control section 170, the coordinate calculation section 114 performs the conversion of the coordinate based on the coordinate conversion parameters. The conversion process will be described later. Further, the coordinate conversion section 120 converts the coordinate output from the coordinate calculation section 114 based on the image position information described later, and then outputs the coordinate thus converted into to the output section 150.

The output section 150 is connected to the PC 300, and outputs the coordinate data, on which the conversion process of the coordinate conversion section 120 has been performed, to the PC 300. The output section 150 corresponds to the function device 11, the storage section 12, and the supply section 15 shown in FIG. 1. In other words, the output section 150 is connected to the PC 300 in a manner compliant with the USB standard, and has two interfaces. It should be noted that the storage section 12 can also have a configuration of being formed of, for example, a part of the storage section 180 instead of the configuration of being included in the output section 150. Further, the supply section 15 can also be one of the functions of the control section 170.

Here, although the explanation will be presented assuming that the input section 160 and the output section 150 are functional blocks separated from each other, it is obviously possible to integrate them into a single interface. For example, it is also possible to realize both of the functions of the output section 150 and the input section 160 by a single USB interface. Further, it is also possible for the output section 150 to be connected to the image processing section 133 provided to the image processing unit 130, and to output the coordinate, on which the conversion process of the coordinate conversion section 120 has been performed, to the image processing unit 130. The output destination of the output section 150 is controlled by the control section 170. The coordinate data (first coordinate data and second coordinate data) output by the output section 150 is output to the PC 300 as similar data to the coordinate data output by a pointing device such as a mouse, a trackball, a digitizer, or a pen tablet. For example, it is possible to assign holding down operations of a first switch 211 and a second switch 212 provided to the pen 200 to either one of a so-called right click operation and left click operation of a mouse and the other thereof, respectively.

Further, if the PC 300 treats the coordinate data output from the output section 150 equivalently to the coordinate data output by general-purpose pointing devices, a general-purpose device driver program corresponding to such general-purpose pointing devices can be used. In general, since such general-purpose device driver programs are previously installed as a part of the OS of the PC 300, it is not necessary to further install a device driver program in the case of using the general-purpose device driver program. Further, since the general-purpose device driver program is used, it is not necessary to prepare a dedicated device driver program on the one hand, but the information which can be exchanged between the projector 100 and the PC 300 is limited to the range determined by the specification of the general-purpose device driver program on the other hand.

Further, it is also possible to prepare the dedicated device driver program corresponding to the projector 100, and then use the device driver program after installing it into the PC 300. In this case, the dedicated device driver program is required on the one hand, and the information which can be exchanged between the projector 100 and the PC 300 can arbitrarily be set in accordance with the specification of the dedicated device driver program.

Figure 4:
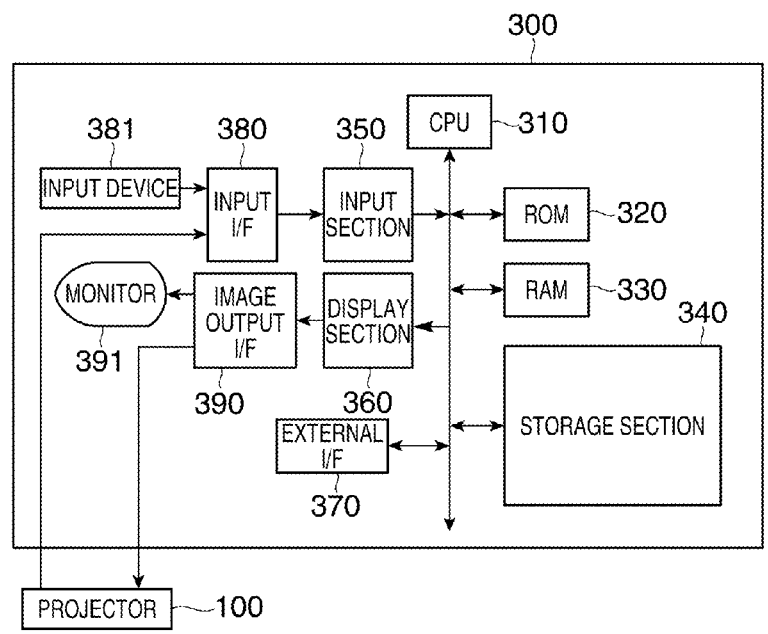
FIG. 4 is a block diagram showing a configuration of a PC.

FIG. 4 is a block diagram showing a configuration of the PC 300. As shown in FIG. 4, the PC 300 is provided with a CPU 310 for executing a control program to centrally control each part of the PC 300, a ROM 320 storing a basic control program to be executed by the CPU 310 and the data related to the program, a RAM 330 for temporarily storing the programs to be executed by the CPU 310 and the data, a storage section 340 for storing the programs and the data in a non-volatile manner, an input section 350 for detecting input operations and outputting data and operation signals representing the input content to the CPU 310, a display section 360 for outputting display data for displaying the processing result or the like by the CPU 310, and an external I/F 370 for transmitting/receiving the data and so on to/from an external device, and these sections are connected to each other through a bus.

The input section 350 has an input I/F 380 having a connector and a power supply circuit, and an input device 381 is connected to the input I/F 380. The input I/F 380 corresponds to the host controller 31 shown in FIG. 1, and the input device 381 corresponds to, for example, a keyboard or a pointing device such as a mouse or a digitizer.

A USB cable coupled to the projector 100 is connected to the input I/F 380, and the coordinate of the indication position by the pen 200 is input from the projector 100 to the input I/F 380. Here, the coordinate data output by the output section 150 of the projector 100 is input to the input I/F 380 as the similar data to the coordinate data output by a pointing device such as a mouse, a trackball, a digitizer, or a pen tablet. Therefore, the PC 300 can process the coordinate data input from the projector 100 as an input signal from the input device, and can perform an operation of, for example, performing the translation of a mouse cursor or a pointer based on the coordinate data.

The display section 360 has an image output I/F 390 provided with a connector for outputting the image signal, a monitor 391 and an image signal cable (not shown) to be coupled to the projector 100 are connected to the image output I/F 390. The image output I/F 390 is provided with, for example, a plurality of VGA (Video Graphics Array) terminals for outputting an analog video signal, DVI interfaces, USB interfaces, and LAN interfaces for outputting a digital video signal, S-video terminals for outputting a video signal such as NTSC, PAL, or SECAM, RCA terminals for outputting a composite video signal, D-terminals for outputting a component video signal, and HDMI connectors compliant with the HDMI standard, and the monitor 391 and the projector 100 are connected respectively to these connectors. Further, there can also be adopted a configuration in which the image output I/F 390 is provided with a DisplayPort developed by VESA, and specifically, there can also be adopted a configuration in which the image output I/F 390 is provided with the DisplayPort connector or the Mini-DisplayPort connector and an interface circuit compliant with the DisplayPort standard. In this case, the PC 300 can output the digital video signal to the projector 100, the monitor 391, or other devices via the DisplayPort. It should be noted that it is also possible for the image output I/F 390 to perform transmission/reception of the image signal using wired communication, or to perform transmission/reception of the image signal using wireless communication.

The storage section 340 stores a display control program to be executed by the CPU 310, and image data to be output when executing the display control program. When executing the display control program, the CPU 310 performs a process of transmitting the image data to the projector 100. In this process, the CPU 310 reproduces the image data, and at the same time makes the display section 360 generate the image signal with a predetermined display resolution and then output it to the image output I/F 390. Here, the display section 360 outputs the analog image signal to a connector for outputting an analog signal, and outputs the digital image data to a connector for outputting digital data.

Further, the CPU 310 generates an image for displaying the pointer P1 (FIG. 2) at a position corresponding to the coordinate corresponding to an operation of the pen 200 when the coordinate is input from the input section 350 during the execution of the display control program. Then, the CPU 310 generates the image data having the pointer P1 superimposed on the image data presently reproduced, and then outputs the image data from the image output I/F 390 to the projector 100. Further, as described later, the CPU 310 performs setting and control with respect to the display in the handwriting area. In other words, in the present embodiment the control section 310 realizes a function corresponding to the execution section 32 shown in FIG. 1.

As described above, in the display system 1, the PC 300 performs the function of drawing the pointer P1 superimposed on the image data output by the PC 300 to the projector 100.

Figure 5:
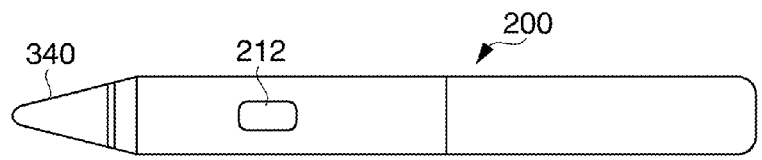
FIG. 5 is a diagram showing an example of an appearance of a pen.

FIG. 5 is a diagram showing an example of an appearance of the pen 200. The pen 200 is provided with the first switch 211 and the second switch 212. The first switch 211 is disposed on the tip of the pen 200, and is a switch configured so that the user can hold down the switch by pressing the pen 200 against the screen SC. On the other hand, the second switch 212 is disposed on the shaft of the pen 200 so as to be able to be held down. The first switch 211 and the second switch 212 each can function like a button of a mouse. Further, the tip of the first switch 211 is provided with an opening, and is configured so that light (visible light or non-visible light) is emitted through the opening.

Figure 6:
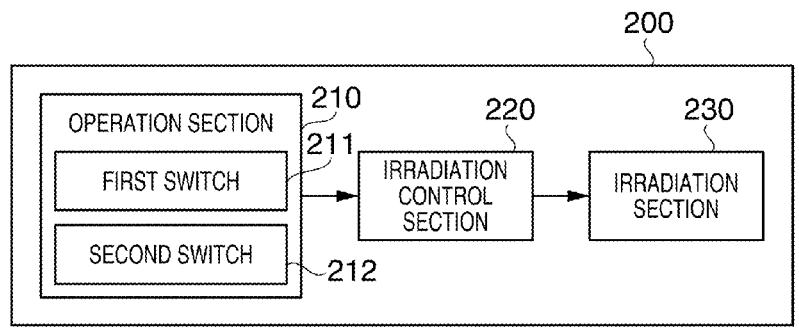
FIG. 6 is a block diagram showing a configuration of the pen.

FIG. 6 is a block diagram showing a configuration of the pen 200. The pen 200 is provided with an operation section 210 having the first switch 211 and the second switch 212, and for outputting an operation signal corresponding to the operation of the user, an irradiation control section 220 for controlling the irradiation condition of the light in accordance with the operation signal from the operation section 210, and an irradiation section 230 for irradiating an object with the light in accordance with the control by the irradiation control section 220. The irradiation control section 220 varies the irradiation pattern (e.g., the period of lighting or extinction, the intervals, the intensity, and the wavelength) of the light in accordance with the operation of the user. The irradiation section 230 has a light source such as an LED or a laser diode. The light with which the irradiation section 230 irradiates an object can be either of visible light and non-visible light (e.g., infrared light).

In the present embodiment, the number of the pens 200 existing corresponds to the number of the users, namely a plurality of the pens 200 exists. In the present embodiment, each of the pens 200 is configured to be optically discriminated from each other. The pens 200 can be configured so as to be discriminated from each other by making the irradiation patterns of the light different from each other. Further, the pens 200 can also be discriminated by making the wavelengths (i.e., the colors) of the light, with which the object is irradiated, different from each other, or can also be discriminated by providing images such as barcodes or ID to the housing of the pens 200 with printing or labels, and then analyzing the shot image data obtained by shooting the images. Such image analysis can be performed by the position detection processing section 113.

Operation Example of Calibration Etc.

Figure 7A:
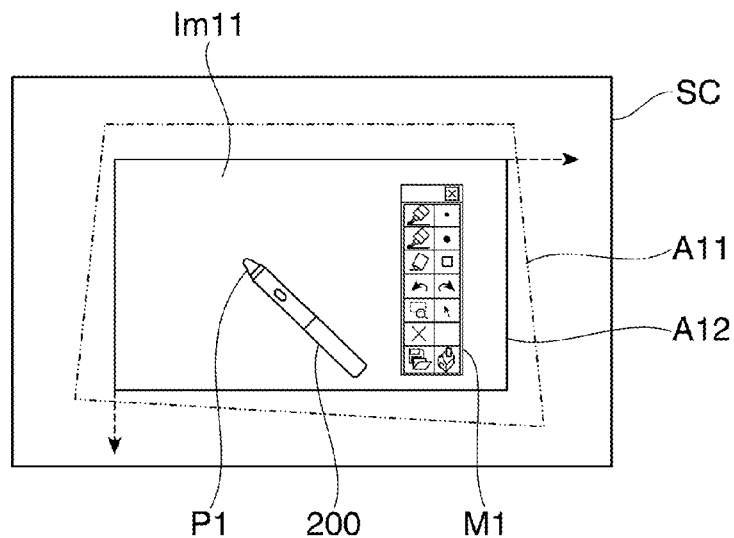
FIGS. 7A and 7B are diagrams exemplifying images displayed by the projector.
Figure 7B:
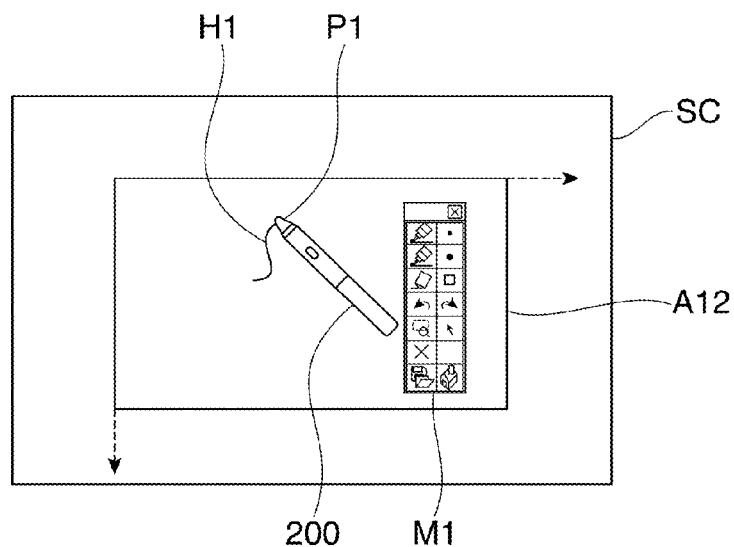

FIGS. 7A and 7B are diagrams showing an example of projecting an image on a screen SC by the projector 100, wherein FIG. 7A shows a state of projecting the pointer P1 in accordance with the indication position of the pen 200, and FIG. 7B shows the state in which a hand-written image H1 is drawn in accordance with the indication position.

In this example, if the display image is projected using the entire liquid crystal panel provided to the light modulation device 145, the image is formed in the projection-allowable area A11 indicated by the dashed-two dotted line in FIG. 7A. Since the keystone distortion is generated in the projection-allowable area A11 as shown in FIG. 7A except the case in which the projector 100 is located right in front of the screen SC, the projector 100 performs the keystone correction due to the function of the display control section 132. After performing the keystone correction, the display image is projected in the actual projection area A12 as a part of the projection-allowable area A11. The actual projection area A12 is normally set so as to have a rectangular shape on the screen SC, and have the maximum size within the projection-allowable area A11. Specifically, the actual projection area A12 is determined based on the resolution of the liquid crystal panel of the light modulation device 145 and the level of the keystone distortion, and is not necessarily required to have the maximum size. It should be noted that if the keystone distortion does not occur in the image projected from the projector 100, execution of the keystone correction is not required. In this case, the actual projection area A12 coincides with the projection-allowable area A11.

The control section 170 of the projector 100 performs the calibration to the actual projection area A12 on which the keystone correction has been performed. In the calibration, the control section 170 controls the image processing section 133 to draw a predetermined image for calibration. In the state in which the image for calibration is projected on the screen SC, the position detection unit 110 shoots the screen SC under the control of the control section 170. The image for calibration is, for example, an image with some dots arranged on the white background, and is stored in advance in the storage section 180 and so on. It should be noted that the image for calibration is not necessarily required to be stored in the storage section 180 or the like, it is also possible to adopt the configuration in which the control section 170 generates the image for calibration on a case-by-case basis every time necessity of the execution of the calibration arises and the calibration is executed.

The area in the screen SC to be the object of the calibration can be the entire actual projection area A12 or a part of the actual projection area A12. As the case of setting a part of the actual projection area A12 to the object of the calibration, there can be cited the case in which the display is performed so that the vertical width of the display image of the projector 100 coincides with the vertical width of the screen SC while the aspect ratio of the image to be displayed by the projector 100 and the aspect ratio of the screen SC are different from each other (e.g., the display resolution of the projector 100 is WXGA (with the aspect ratio of 15:9), while the aspect ratio of the screen SC is 4:3). In this case, it is possible to take the area included in the screen SC out of the actual projection area A12 of the projector 100 as the object of the calibration, and exclude the other area from the object of the calibration.

The control section 170 detects the outline of the display image in the shot image data, namely the boundary between the outside of the actual projection area A12 and the actual projection area A12, and the dots in the shot image data, and then identifies the correspondence relationship between positions in the shooting range (field angle) of the position detection unit 110, namely the positions in the shot image, and positions on the actual projection area A12. The control section 170 obtains the coordinate conversion parameters to be used by the coordinate calculation section 114 as described later based on the correspondence relationship between the positions on the shot image and the positions on the actual projection area A12 identified by the calibration. The coordinate conversion parameters include, for example, the data for making the coordinate on the image drawn by the image processing section 133 and the coordinate obtained on the shot image data correspond to each other. The coordinate calculation section 114 can convert the coordinate obtained on the shot image data into the coordinate on the image drawn by the image processing section 133 based on this coordinate conversion parameter. The coordinate calculation process is performed based on this coordinate conversion parameter.

Since the calibration is performed by the control section 170 executing a calibration program (not shown) stored in the storage section 180, it is not required to install and execute the calibration program in the PC 300. Further, the calibration can be the process automatically performed by the control section 170 based on the shot image data, or can be the process requiring an operation of the user to the image for calibration projected. Further, it is also possible for the calibration to be performed by using both of these processes. As the operation by the user to the image for calibration, there can be cited, for example, an operation of the user to indicate the dot included in the image for calibration thus projected with the pen 200.

The position detection unit 110 provided to the projector 100 performs the shooting in the state in which the image is projected in the actual projection area A12, virtually sets the Cartesian coordinate system in the shot image taking either one of the vertexes of the actual projection area A12 as the origin as indicated by the dotted arrows in the drawings, and obtains the coordinate of the tip position of the pen 200 in the coordinate system. The Cartesian coordinate system is set based on the coordinate conversion parameters, which can be obtained by the calibration described above. Subsequently, when the coordinate of the tip of the pen 200 in the image data displayed in the actual projection area A12 is obtained by the coordinate conversion section 120, the pointer P1 and the menu bar M1 shown in FIG. 7A, for example, are displayed in accordance with the coordinate. The pointer P1 is drawn as a symbol indicating the tip position of the pen 200. The pointer P1 can be an image of a simple dot, or can also be an image of a cross or an arrow. Further, the menu bar M1 is a graphical user interface (GUI) widget, which can be operated by the pen 200, and it becomes possible for the user to perform operations related to the operation of the projector 100 by indicating the buttons disposed in the menu bar M1 with the pen 200. Here, the operations which can be performed by the menu bar M1 include, for example, drawing of a symbol such as a line, storing, deleting, and copying of a hand-written image drawn, transfer of the hand-written image drawn, an operation (undo) of undoing the last operation, and an operation (redo) of redoing the operation undone by the undo operation.

As a specific example, by moving the pen 200 from the position shown in FIG. 7A to the position in FIG. 7B, the hand-written image H1 is drawn along the trajectory of the tip of the pen 200. The hand-written image H1 is an image, which the PC 300 makes the projector 100 draw in accordance with the coordinate data representing the indication position of the pen 200 similarly to, for example, the pointer P1 and the menu bar M1. Further, it is possible for the user to set the color and the thickness of the line of the hand-written image H1 by indicating the menu bar M1 before drawing the hand-written image H1.

Further, in the menu bar M1, there can be disposed a button for controlling the slide show display for sequentially displaying a plurality of images (e.g., image data stored by an external storage device such as a USB flash memory connected to, for example, the external I/F 370) which can externally be supplied, a button for executing setting (e.g., change in the aspect ratio and change in the color mode) related to the function itself of the projector 100, and so on. In other words, the operations performed by the menu bar M1 can include those having no direct relation with drawing of a hand-written image. In the case in which the indication position of the pen 200 is output from the coordinate conversion section 120, the control section 170 obtains the coordinate to identify the button indicated in the menu bar M1, and then executes the operation corresponding to the indication operation.

Figure 8A:
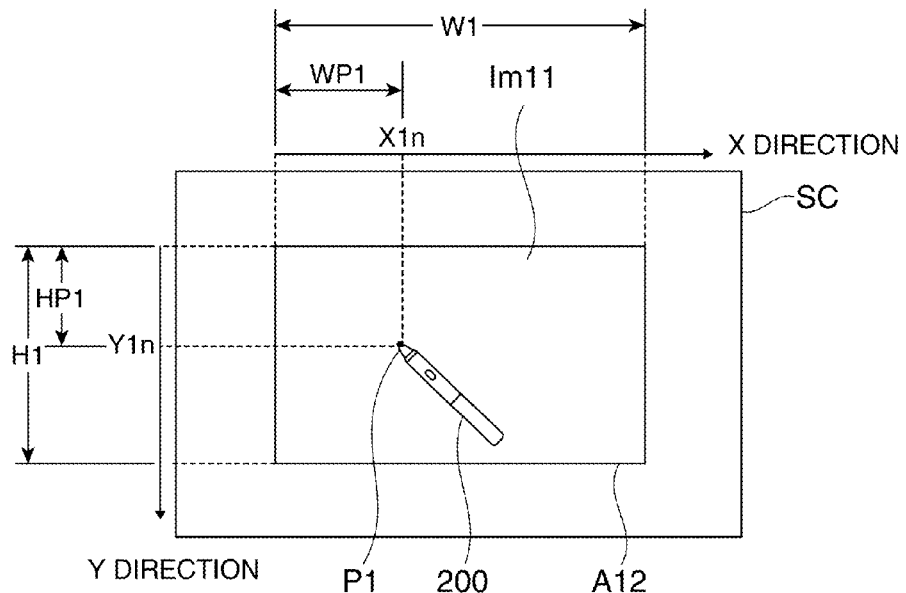
FIGS. 8A and 8B are explanatory diagrams showing the procedure of the process of detecting and converting the coordinate.
Figure 8B:
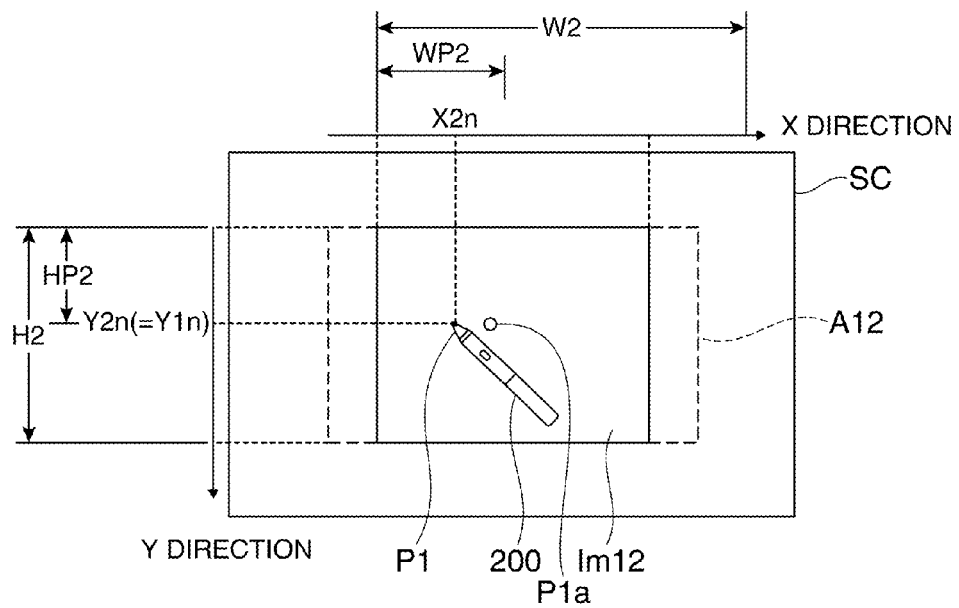

FIGS. 8A and 8B are explanatory diagrams showing how the projector 100 performs the process of detecting the coordinate of the indication position, and then converting it into the coordinate in the image data, wherein FIG. 8A shows the initial state of the series of operations, and FIG. 8B shows the state in which the resolution of the display image is changed from the state shown in FIG. 8A. It should be noted that in the following explanation, there will be explained the case in which no keystone distortion occurs in the image projected by the projector 100, and the image displayed in the entire modulation area of the light modulation device 145 is displayed in the actual projection area A12. In this case, the actual projection area A12 coincides with the projection-allowable area A11, and the resolution of the image displayed in the actual projection area A12 is equal to the resolution of the liquid crystal panel of the light modulation device 145.

In the example shown in FIG. 8A, the resolution of the liquid crystal panel of the light modulation device 145 and the resolution of the image displayed in the actual projection area A12 are both 1280×800 dots. Further, the resolution of the image data input from the PC 300 is also 1280×800 dots. Therefore, in the actual projection area A12, the display image Im11 with the resolution of 1280×800 dots is displayed. The position detection unit 110 sets the X-Y Cartesian coordinate system taking the upper left corner of the actual projection area A12 as the origin, the rightward direction as the X-axis positive direction, and the downward direction as the Y-axis positive direction, and detects the coordinate $(X1n, Y1n)$ of the indication position of the pen 200 in the actual projection area A12. The coordinate data output by the coordinate calculation section 114 represents the coordinate $(X1n, Y1n)$ of the indication position.

The coordinate $(X1n, Y1n)$ of the indication position is a coordinate (normalized coordinate) normalized in the actual projection area A12. Specifically, the coordinate $X1n$ of the indication position in the X-axis direction represents the ratio of the length WP1 from the left side of the actual projection area A12 to the indication position with respect to the lateral width W1 of the actual projection area A12. Further, the coordinate $Y1n$ of the indication position in the Y-axis direction represents the ratio of the length HP1 from the upper side of the actual projection area A12 to the indication position with respect to the vertical width H1 of the actual projection area A12. It should be noted here that the values W1, WP1, H1, and HP1 are expressed with the number of pixels.

In this case, the coordinate $(X1n, Y1n)$ is calculated by the formulas 1, 2 described below.

$$X1n = WP1 \div W1 \quad (1)$$

$$Y1n = HP1 \div H1 \quad (2)$$

For example, in the example shown in FIG. 8A, WP1=400 and HP1=300 are assumed. Since the resolution of the display image Im11 is 1280×800 dots, W1=1280 and H1=800 are true. Therefore, the expressions of $X1n = 400 \div 1280 \approx 0.313$ and $Y1n = 300 \div 800 = 0.375$ can be obtained. Further, in this case, the coordinates of the upper left vertex of the actual projection area A12, the upper right vertex thereof, the lower left vertex thereof, and the lower right vertex thereof are expressed as (0, 0), (1, 0), (0, 1), and (1, 1), respectively. It should be noted that in the state shown in FIG. 8A since the actual projection area A12 and the area in which the display image Im11 is displayed coincide with each other, the coordinates $(X1n, Y1n)$ can also be regarded as the coordinates normalized in the display image Im11.

Here, if the image data input from the PC 300 is switched to the display image Im12 with the resolution of 1024×768 dots, the projector 100 scales the image data so that the vertical resolution (768 dots) of the image data is increased to the vertical resolution (800 dots) of the liquid crystal panel. Since the scaling is performed in both of the vertical direction and the horizontal direction in a similar manner, the horizontal resolution (1024 dots) of the image data is scaled to 1024× (800÷768)≈1066 dots. As a result, as shown in FIG. 8B, the display image Im12 with the resolution of 1066×800 dots is projected on the screen SC. Since the aspect ratio and the resolution of the display image Im12 are different from the aspect ratio and the resolution of the display image Im11, the area in which the display image Im12 is projected does not coincide with the actual projection area A12. In the example shown in FIG. 8B, the area in which the display image Im12 is projected is smaller than the actual projection area A12. Further, the projector 100 changes the position thereof so that the image thus scaled is displayed at a position near to the center as much as possible. Therefore, in the actual projection area A12, the position of the upper left vertex of the display image Im11 and the position of the upper left vertex of the display image Im12 do not coincide with each other.

Here, as shown in FIGS. 8A and 8B, when switching the display image Im11 to the display image Im12 in the state in which the pen 200 on the screen SC is fixed, the relative position between the indication position and the image displayed varies although the indication position itself is not moved. Therefore, the coordinate $(X1n, Y1n)$ of the indication position normalized taking the upper left vertex of the display image Im11 as the origin and the coordinate $(X2n, Y2n)$ of the indication position normalized taking the upper left vertex of the display image Im12 as the origin are different from each other. Therefore, if the pointer P1 is displayed based on the coordinate $(X1n, Y1n)$ of the indication position in the actual projection area A12, which the position detection unit 110 has calculated based on the shot image data of the imaging section 111, the pointer P1 is shifted from the actual indication position.

In the example shown in FIG. 8B, for example, the upper left vertex of the display image Im12 is located at a position shifted 107 (=(1280−1066)÷2) pixels rightward from the upper left vertex of the display image Im11. Therefore, defining that the length from the left side of the display image Im12 to the indication position is WP2, and the length from the upper side of the display image Im12 to the indication position is HP2, WP2=WP1−107=400−107=293 and HP2=HP1=300 are obtained. Further, since the resolution of the display image Im12 is 1066×800 dots, the lateral width W2 and the vertical width H2 of the display image Im12 are W2=1066 and H2=800, respectively. Therefore, the coordinate $(X2n, Y2n)$ of the indication position normalized taking the upper left vertex of the display image Im12 as the origin is expressed as $X2n=(400-107)÷1066≈0.275$, $Y2n=300÷800=0.375$. As described above, $X1n≠X2n$ is resulted, and if the resolution of the display image is changed, the normalized coordinate of the indication position is also changed.

Therefore, if the pointer P1 is displayed at the coordinate $(X1n, Y1n)=(0.313, 0.375)$ in the coordinate system taking the upper left corner of the display image Im12 having been changed as the origin, a pointer P1a is displayed at the position separate from the tip of the pen 200. This is because the PC 300 performs the drawing taking the upper left of the image as the origin based on the normalized coordinate output from the position detection unit 110 when drawing the pointer P1. As described above, since the coordinate obtained taking the actual projection area A12 as a reference is affected by the resolution of the display image, it is not achievable for the PC 300 to directly use the coordinate calculated by the position detection unit 110 for the display of the pointer P1.

Therefore, the projector 100 performs the process of converting the coordinate $(X1n, Y1n)$ of the indication position calculated by the coordinate calculation section 114 of the position detection unit 110 into the coordinate $(X2n, Y2n)$ of the indication position in the display image presently displayed using the coordinate conversion section 120 so as to be able to cope with the case in which the resolution of the display image has changed.

The coordinate conversion section 120 converts the coordinate $(X1n, Y1n)$ into the coordinate $(X2n, Y2n)$ based on the image position information input from the image processing section 133. The image position information is the information related to the configuration of the image in the modulation area of the light modulation device 145. Further, the modulation area of the light modulation device 145 corresponds to the actual projection area A12 on the screen SC. Therefore, the image position information represents the position (configuration) of the display image with respect to the actual projection area A12. In the present embodiment, the image position information represents the position (configuration) and the size of the display image with respect to the actual projection area A12. Based on the image position information, the coordinate conversion section 120 obtains the coordinate of the indication position in the display image. For example, in the example shown in FIGS. 8A and 8B, the values W1, H1, W2, and H2 correspond to the image position information. Further, the coordinate (XO1, YO1)=(0, 0) of the upper left end of the display image Im11 and the coordinate (XO2, YO2)=(107, 0) of the upper left end of the display image Im12 also correspond to the image position information. It should be noted that the coordinates XO1, YO1, XO2, and YO2 are not the normalized coordinates, but are those representing the positions of the upper left vertex of the display image with the number of pixels taking the upper left vertex (or the upper left vertex of the modulation area of the light modulation device 145) of the actual projection area A12 as the origin in the actual projection area A12 (or the modulation area of the light modulation area 145). In the example shown in FIGS. 8A and 8B, the image position information of the display image Im11 (XO1, YO1, W1, H1)=(0, 0, 1280, 800) is obtained, and the image position information of the display image Im12 (XO2, YO2, W2, H2)=(107, 0, 1166, 800) is obtained.

The coordinate $(X2n, Y2n)$ calculated by the coordinate calculation section 120 can be used as the information for identifying the position in the image data when the PC 300 draws the pointer P1, the menu bar M1, or the hand-written image H1 in the image data as the processing object. Therefore, the pointer P1, the menu bar M1, and the hand-written image H1 can accurately be drawn in accordance with the indication position by the pen 200 without being affected by the resolution of the display image, the zooming ratio, and so on.

Incidentally, the position and the size of the display image displayed in the actual projection area A12 are affected by the resolution and the display position of the display image. For example, in the case in which the projector 100 performs the process of changing the projection state such as change in the display resolution, change in the aspect ratio, zooming, change (translation) in the display position of the image, or multi-screen display process in accordance with an operation by the operation section 190, or a control signal transmitted from the PC 300, the image position information is also changed. As described above, the image position information is the information related to the configuration of the image placement area (the area in which the display images Im11, Im12 are projected (displayed)) with respect to the actual projection area A12. In other words, the image position information is the information representing the position (configuration) of the display image with respect to the actual projection area A12 (the display-allowable area). Further, the image position information also varies in the case (e.g., the case in which the setting with respect to the resolution is changed in the PC 300) in which the display resolution of the PC 300 is varied, and the resolution of the image data output by the PC 300 to the projector 100 is varied. It should be noted that the "multi-screen display process" denotes the process of dividing the actual projection area A12 of the projector 100 into a plurality of areas, and displaying the images different from each other respectively input from a plurality of image supply devices in the respective areas.

The coordinate conversion section 120 obtains the information from the control section 170 and the display control section 132 to update the image position information, and then converts the coordinate based on the image position information thus updated every time the projection state (the display state) of the display image by the projection section 30 is varied. The image position information is updated at, for example, the timings cited below.

The control section 170 has detected the input of the image data from the PC 300.

The control section 170 has detected the change in the information (e.g., the resolution of the image) related to the image data input from the PC 300.

The resolution of the image data has changed in the projector 100.

The aspect ratio of the image data has changed in the projector 100.

The digital zoom function of expanding/contracting the image to be drawn by the light modulation device 145 using the image processing of the image data to be projected has been executed or terminated.

The display position of the display image with respect to the actual projection area A12 has been changed.

The image has been enlarged by the digital zoom function described above, and then the function of changing the display position of the image using the image processing has been executed or terminated.

The Tele/Wide function for expanding/contracting the projection size of the whole including the image drawn by the light modulation device 145 and the background, namely the entire actual projection area A12, by performing the image processing on the image data has been executed or terminated.

The image has been contracted by the digital zoom function described above, and then the picture shift function of changing the display position of the image using the image processing has been executed or terminated.

The simultaneous display of a plurality of images has been executed or terminated.

The output destination to which the coordinate is output from the coordinate conversion section 120 has been changed from the image processing unit 130 to the PC 300 (the output section 150) or vice versa.

The change in the resolution, the change in the aspect ratio, and the execution and termination of the variety of functions are all executed by the image processing unit 130 under the control of the control section 170. It should be noted that the timings cited above are nothing more than examples, and it is obviously possible to update the image position information at other timings.

Figure 9:
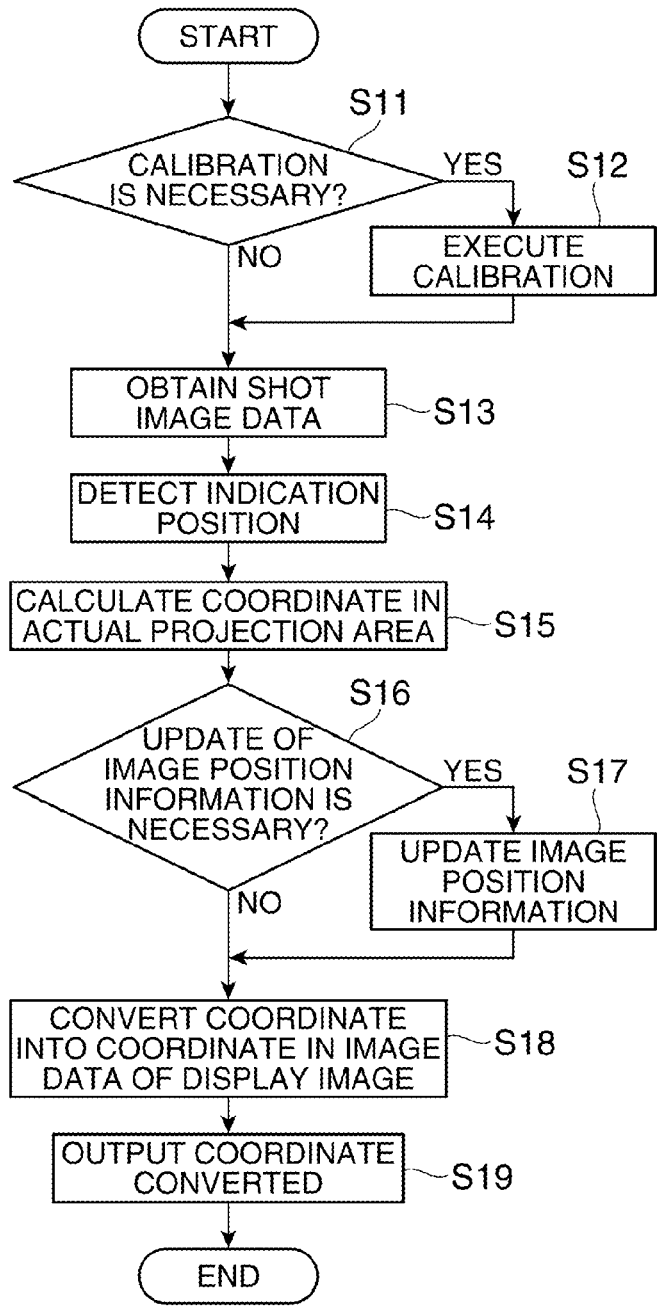
FIG. 9 is a flowchart showing an operation of the projector.

FIG. 9 is a flowchart showing the operation of the projector 100, and in particular showing the operation of detecting the indication position by the pen 200 and then outputting the coordinate of the indication position.

After the start-up of the projector 100 or in the case in which display of the pointer P1 or the menu bar M1 is instructed by the operation of the operation section 190, the operation shown in FIG. 9 is repeatedly executed at regular intervals until the projection is terminated.

Firstly, whether or not the calibration is necessary is determined (step S11). This determination can also be performed based on the instruction of the user expressing whether or not the calibration is necessary, or it is also possible that the control section 170 automatically determines whether or not the calibration is necessary to be performed, and the determination is performed automatically based on the determination result. If the calibration is necessary (YES in the step S11), the calibration is performed (step S12) as explained with reference to FIG. 7A. Specifically, by making the image processing section 133 draw the image for calibration, making the position detection unit 110 perform shooting in the state in which the image for calibration is projected, and then detecting the outline of the actual projection area A12 in the shot image data thus obtained and the characteristic points (e.g., the dots) included in the image for calibration, the correspondence relationship between the image drawn by the image processing section 133 and the shot image data is obtained. It should be noted that it is sufficient to perform the calibration once after starting the use of the projector 100, and it is not necessary to perform the calibration once again unless a specific event occurs. It is necessary to newly perform the calibration in, for example, the cases 1 through 3 below.

1. The keystone correction has been performed.
2. The installation conditions of the projector 100 have changed. For example, the relative position (including the orientation) of the projector 100 with respect to the screen SC has changed.
3. Optical conditions have changed. For example, the state of focus or zoom of the projection optical system 146 has changed. The optical axis of the projection optical system 146 or the imaging section 111 is shifted due to temporal change thereof and so on.

If any of these events occurs, since the correspondence relationship between the position on the shot image data and the position on the image drawn by the image processing section 133 in the initial state, which forms the basis for the coordinate conversion section 120 to calculate the coordinate, is changed (in other words, the coordinate conversion parameters are varied), it is necessary to newly perform the calibration. In contrast, since it is not necessary to perform the calibration once again unless any of these events occurs, if the events described above have not occurred during the period from when the projector 100 is used previously to when the projector 100 is used this time, the coordinate conversion parameters obtained in the previous calibration can also be reused without newly performing the calibration. As the method for the control section 170 to determine whether or not the calibration is necessary to be performed, there can be cited, for example, a method of making the determination based on the presence or absence of the operation of the switch instructing the execution of the keystone correction in the operation section 190, and a method of providing a sensor for detecting the tilt and the movement to the projector 100, and making the determination based on the variation in the detection value of the sensor. Further, it is also possible for the control section 170 to automatically perform the calibration if the focus adjustment or the zoom adjustment in the projection optical system 146 is performed. Further, it is also possible to provide a dedicated switch to the operation section 190 or the remote controller so that the user figures out the change in the installation position of the projector 100 and the optical conditions, and can perform the operation of instructing the execution of the calibration.

When the shooting control section 112 makes the imaging section 111 shoot the range including the actual projection area A12 under the control of the control section 170, the position detection processing section 113 obtains (step S13) the shot image data, and then detects (step S14) the indication position of the pen 200 based on the shot image data. Subsequently, the coordinate calculation section 114 calculates (step S15) the coordinate of the indication position detected by the position detection processing section 113. The coordinate calculated in the step S15 is the coordinate in the actual projection area A12, and corresponds to the coordinate (X1$n$, Y1$n$) explained with reference to FIG. 8A.

The coordinate conversion section 120 determines (step S16) whether or not the update of the image position information is necessary, and then obtains the information from the control section 170 and the display control section 132, and updates (step S17) the image position information if the update is necessary. The timing of the process of the step S17 is not limited to the posterior stage of the step S15, but the process of the step S17 can also be performed at the timings described above as an example.

Subsequently, the coordinate conversion section 120 performs (step S18) the process for converting the coordinate calculated by the coordinate calculation section 114 into the coordinate in the image data of the display image. The coordinate thus converted corresponds to the coordinate (X2$n$, Y2$n$) explained with reference to FIG. 8B.

The coordinate conversion section 120 outputs (step S19) the coordinate thus converted to the PC 300, and then terminates the present process.

As described above, in the display system 1, the projector 100 is provided with the projection unit 140 for displaying the display image on the screen SC based on the image data, the position detection processing section 113 for detecting the indication position with respect to the display image on the screen SC, the coordinate calculation section 114 for calculating first coordinate information, which is the coordinate of the indication position in the display-allowable area (e.g., the actual projection area A12) in the screen SC, the coordinate conversion section 120 for converting the first coordinate information calculated by the coordinate calculation section 114 into second coordinate information, which is the coordinate in the image data, and the output section 150 for outputting the second coordinate information obtained by the coordinate conversion section 120, and outputs the coordinate of the indication position by the pen 200 as the coordinate in the image data, and therefore, it is possible to identify the relative position between the indication position and the image data in the PC 300 and so on, which use the coordinate thus output, without being affected by the display configuration such as the display resolution or the size of the display area. Since it is not necessary to make the image data itself and the indication position directly correspond to each other in the process of obtaining the coordinate of the indication position in the image data, it is not necessary to perform the calibration even if the change in size and so on of the image data occurs. Therefore, the execution frequency of the calibration can be reduced. Thus, enhancement of the convenience of the projector 100 can be achieved. Further, since it is not necessary to execute the program for the calibration on the PC 300 side, the load to the user unfamiliar with the operation of the PC 300 can be reduced.

Further, since the coordinate conversion section 120 converts the first coordinate information calculated by the coordinate calculation section 114 into the second coordinate information based on the image position information, which is the information representing the position of the display image with respect to the display-allowable area, even if the image position information, which is the information representing the position of the display image with respect to the display-allowable area, is varied, the coordinate conversion section 120 can accurately convert the coordinate of the indication position by the pen 200, and then output the result.

Further, the coordinate conversion section 120 converts the first coordinate information calculated by the coordinate calculation section 114 into the second coordinate information based on the resolution of the image data. For example, the coordinate conversion section 120 performs the conversion of the coordinate using the image position information reflecting the display resolution of the projection section 30 and the resolution of the image data. Thus, the coordinate of the indication position can correctly be converted and then output even if the resolution of the image data varies.

Further, the position detection unit 110 detects the position of the pen 200 on the screen SC based on the shot image shot by the imaging section 111 to thereby detect the indication position in the actual projection area A12, and can therefore detect the indication position promptly.

Operation Example Related to Change in Configuration Information

Figure 10:
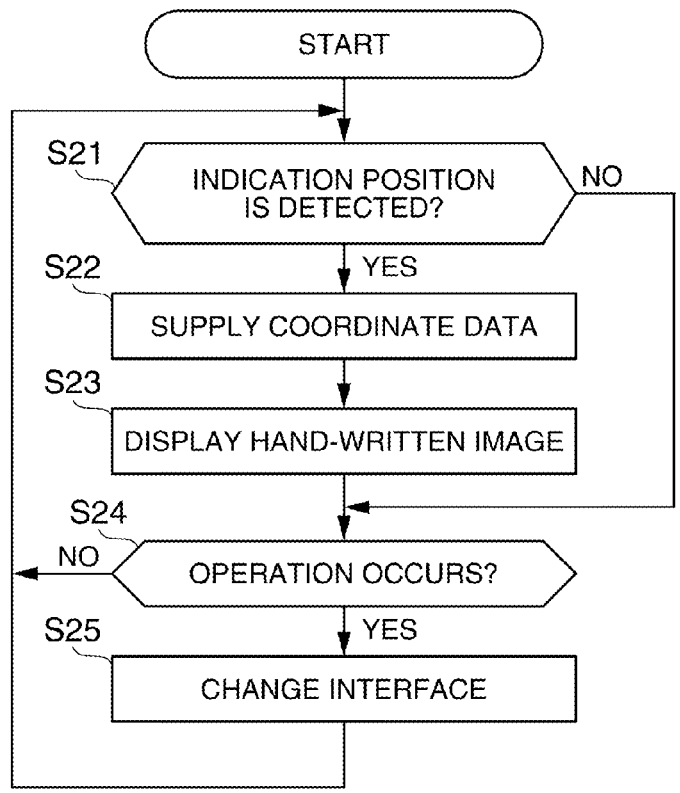
FIG. 10 is a flowchart showing an operation of the projector.

FIG. 10 is a flowchart showing a process executed by the projector 100 in the case of displaying a hand-written image. It should be noted here that it is assumed that a single user uses a single pen 200. As shown in FIG. 10, the control section 170 of the projector 100 firstly determines (step S21) whether or not the indication position has been detected. The control section 170 skips (omits) the process of the steps S22, S23 if the indication position has not been detected on the other hand, or generates the coordinate data, and then supplies it to the output section 150 to thereby transmit (step S22) the coordinate data to the PC 300 if the indication position has been detected on the other hand.

On this occasion, the control section 170 makes assignment to predetermined one of the interfaces (the first interface 11$a$ and the second interface 11$b$) and then supplies the coordinate data. The assignment is described as the configuration information, and has been determined when executing the enumeration. Here, it is assumed that the control section 170 assigns the coordinate data to the first interface 11$a$, and the configuration information of the mouse is used as the configuration information at this moment.

On the other hand, in the PC 300, the CPU 310 identifies the indication position based on the coordinate data, and then generates the image data for displaying the hand-written image corresponding to the indication position thus identified. On this occasion, the CPU 310 recognizes that the coordinate data is indicated by a mouse based on the configuration information received from the projector 100. It should be noted that the coordinate data includes the information representing the holding-down state of the first switch 211 and the second switch 212 in addition to the coordinate of the indication position. When the image data is generated, the PC 300 supplies the projector 100 with the image data thus generated. The control section 170 makes the projection unit 140 display the hand-written image corresponding to the image data to thereby update (step S23) the image on the display surface.

Then, the control section 170 determines (step S24) whether or not the user has performed the operation of changing the interface. Specifically, the control section 170 determines whether or not the operation of displaying the OSD image for changing the interface has been performed, and the operation of changing the interface has been performed via the OSD image thus displayed. The control section 170 changes (step S25) the interface on the one hand if the such an operation has performed, or otherwise skips the process of the step S25, and then performs the process on and after the step S21 again in a repeated manner.

Figure 11:
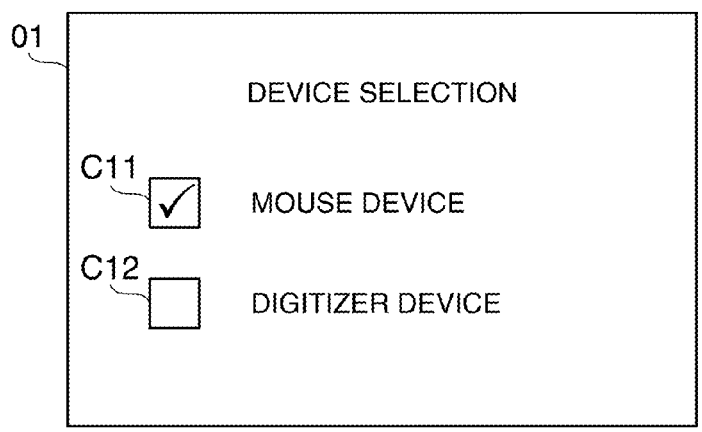
FIG. 11 is a diagram for exemplifying an OSD image.

FIG. 11 is a diagram for exemplifying an OSD image. The OSD image O1 is an OSD image to be displayed in the case in which the number of the pens 200 is one (i.e., the number of the users is one). Check boxes C11, C12 are images respectively showing whether or not the pen 200 is made to function as a mouse, and whether or not the pen 200 is made to function as a digitizer, and a check mark is displayed on either one of the check boxes, which is selected by the user (or set in the initial state). Specifically, in this example, the function of a mouse is assigned to the pen 200.

It is possible for the user to change the assignment of the function to the pen 200 by operating the operation section 190 or the remote controller, or by indicating either one of the check boxes C11, C12 with the pen 200. For example, if the user selects the check box C12 in the state in which the OSD image O1 shown in FIG. 11 is displayed, the function assigned to the pen 200 is switched from the function of a mouse to the function of a digitizer. Simultaneously, the check mark is displayed in the check box C12, and the check mark in the check box disappears.

If the class of the device is switched in such a manner, the information supplied from the projector 100 to the PC 300 also varies. For example, in the case in which the user uses the pen 200 as a digitizer, there is supplied the information, which is not supplied in the case in which the user uses the pen 200 as a mouse. There can be cited an example in which although a value (In Range) representing whether or not the pen 200 exists in a detectable area is supplied together with the coordinate data in the case in which the user uses the pen 200 as a digitizer, it is not required to supply such a value (it should be noted that in the present embodiment the state in which the pen 200 exists in the detectable area denotes the state in which the position detection unit 110 detects the indication position) in the case in which the user uses the pen 200 as a mouse. Further, the holding-down state of the first switch 211 and the second switch 212 can also be recognized as the information different between the case in which the pen 200 functions as a mouse and the case in which the pen 200 functions as a digitizer.

It should be noted that the selection method of the function to be assigned to the pen 200 is not limited to the example shown in FIG. 11, but can also be, for example, a method of selecting the function using a pull-down menu or the like. Further, it is obviously possible to switch the assignment of the function to the pen 200 from the function of a digitizer to the function of a mouse in a similar manner to the example described above.

In this case, as the method of changing the interface, there can be cited the two methods described below. The first method is a method of changing the configuration information assigned to the interface from the configuration information of a mouse to the configuration information of a digitizer (or vice versa). In contrast, the second method is a method of changing the interface itself related to the supply of the coordinate data, and is not the method of changing the configuration information assigned to the interface. In the case of the second method, the correspondence relationship between the interface and the device is determined in advance in such a manner, for example, that the first interface 11a is assigned to a mouse while the second interface 11b is assigned to a digitizer, and the control section 170 performs the control so as to supply the coordinate data via the interface assigned to the device of the class selected by the user.

It should be noted that in the case of the first method it is required to once cut the USB connection between the PC 300 and the projector 100, and then reconnect them to each other. Cutting and connecting mentioned here are realized by pulling up or pulling down the D+ line out of the signal lines in the USB standard. Further, substantially the same thing can be realized by connecting or cutting the Vbus line. The control section 170 transmits the configuration information thus changed in the reconnection after cutting.

In contrast, in the case of the second method, cutting of the USB connection is not necessary.

Further, the change of the interface is also possible in the case of using two pens 200. If the case of using a single pen 200 and the case of using two pens 200 are both possible, it is possible for the control section 170 to identify the number of the pens 200 (or the number of the users), and then display the OSD image corresponding to the number thus identified.

FIGS. 12 and 13 are diagrams showing other examples of the OSD image. The OSD image O2 shown in FIG. 12 is an OSD image for selecting the number of the users, and includes check boxes C21, C22. Further, the OSD image O3 shown in FIG. 13 is an OSD image for respectively selecting the configuration information corresponding to the two users (i.e., two pens 200), and the configuration information for one (user 1) of the users is selected using the check boxes C31, C32, and the configuration information for the other (user 2) of the users is selected using the check boxes C33, C34.

As described hereinabove, it is possible for the display system 1 to switch the class of the device in accordance with the operation of the user in such a manner that the pen 200 is made to function as a mouse, or to function as a digitizer. Thus, it becomes possible for the user to use the single pen 200 selectively for each of the purposes thereof.

Further, according to the display system 1, it is possible for the user him or herself to select the format of the data supplied from the projector 100 to the PC 300. Therefore, according to the display system 1, it is also possible for the user him or herself to switch the function of the pen 200 between the case in which, for example, the OS of the PC 300 supports the digitizer and the case it does not.

Modified Examples

The invention is not limited to the embodiments described above, but can be put into practice in a variety of aspects exemplified below. Further, the invention can also be put into practice in the aspects obtained by combining the modified examples described below if necessary.

1. In the invention, the number of indication bodies is not limited. Specifically, in the invention, it is also possible to use three or more indication bodies at the same time. In this case, the display device can constitute the function device so as to have the same number of interfaces as the number of the indication bodies. It should be noted that the number of the indication bodies can also be one. In this case it is sufficient for the function device to have a single interface. In the case in which the single interface is provided alone, the display device can perform switching of the device using the first method described above, namely the method of changing the configuration information.

2. In the projector according to the invention, it is also possible to realize the whole or a part of the constituent corresponding to the position detection unit 110 with another device. For example, the projector according to the invention can be configured so that an imaging device (e.g., a digital camera) having a function corresponding to the imaging section 111 and the shooting control section 112 can be connected thereto, and can be a device of obtaining the shot image data from the imaging device. Further, the position detection unit 110 can also be a device other than the projector or the PC. In this case, a device separated from the projector can be used as the position detection unit 110. Further, in this case, the position detection unit 110 can be provided with the function corresponding to the coordinate conversion section 120.

3. Although in the embodiment section described above, the explanation is presented citing the configuration in which the display device 10 and the host device 30 are separated from each other as an example, it is also possible to adopt the configuration in which the display device 10 has the host device 30 in the inside thereof. In this case, the display device 10 is also provided with the function of the execution section 32.

4. Although in the embodiment section described above the explanation is presented citing the configuration using the pen 200 as the indication body as an example, it is also possible to use an indication body other than the pen 200. For example, it is also possible to use a finger of the user as the indication body.

5. The pen 200 can be provided with the configuration in which the irradiation section 230 does not irradiate the object with the light if the first switch 211 and the second switch 212 are not held down, and the irradiation section 230 irradiates the object with the light if the first switch 211 or the second switch 212 is held down. Further, it is also possible for the pen 200 to always irradiate the object with the light with the irradiation section 230, and change the irradiation pattern of the light between the case in which the first switch 211 or the second switch 212 is held down and the case in which it is not held down. In either of the cases, whether or not the first switch 211 or the second switch 212 is held down (whether or not the first switch 211 or the second switch 212 is operated) can be detected by analyzing the image shot by the imaging section 111. Further, the projector 100 can also output operation information (first operation information) representing the fact that the first switch 211 or the second switch 212 is held down (operated), and operation information (second operation information) representing the fact that holding down of the first switch 211 or the second switch 212 is terminated (the operation is terminated) to the PC 300. For example, the projector can also output the first operation information to the PC 300 as the information representing the fact that the mouse is clicked on the left button, and output the second operation information to the PC 300 as the information representing the fact that the left click of the mouse is terminated. Further, the projector 100 can also output such information to the PC 300 together with the identification information for identifying the pens 200, and the coordinate information of each of the pens 200. Further, the projector 100 can also output the operation information to the PC 300 as the information representing the operation of a pointing device (e.g., a digitizer) other than the mouse.

6. The control data such as the coordinate information or the identification information can be output from the projector 100 to the PC 300 with the USB communication. Further, the projector 100 can also output the control data to the PC 300 with Bluetooth (registered trademark), a wired LAN, a wireless LAN, and so on.

7. The OSD images O1, O2, and O3 can be used in arbitrary combination with each other. For example, when the display of the OSD image for changing the interface is instructed, it is possible for the projector 100 to firstly display the OSD image O2 for selecting the number of the users, and then display the OSD image O1 if the check box C21 is selected, or the OSD image O3 if the check box C22 is selected.

8. In the case in which a plurality of available pens 200 is provided and the number of the users is one, the other pens (the pens not in use) 200b than the pen 200a used by the user can automatically be assigned to the interface (e.g., the first interface 11a) to which the pen 200a is assigned, or can automatically be assigned to the interface (e.g., the second interface 11b) to which the pen 200a is not assigned. Further, if the number of the users is one, the pens 200b need not be assigned to any of the interfaces.

9. Although in the embodiment described above the control section 170 calculates the coordinate conversion parameters, it is also possible for the constituent other than the control section 170 to calculate the coordinate conversion parameters. For example, any of the constituents (e.g., the coordinate calculation section 114) inside the position detection unit 110 can also calculate the coordinate conversion parameters.

10. If the coordinate of the indication position calculated by the coordinate calculation section 114 is not included in the area where the image data is displayed, in other words, if the indication position is not included in the display image, the coordinate conversion section 120 can also set the coordinate of the position, which is included in the area where the display image is displayed, and is near to the indication position, to the coordinate obtained by the conversion. According to such a configuration, the coordinate of the indication position can be output even in the case in which the position where the image is not displayed is indicated. Further, the coordinate output therefrom is the coordinate of the position near to the indication position, and can therefore be processed by the PC 300 and so on similarly to the case of the coordinate of the indication position.

Further, it is also possible to adopt the configuration in which the coordinate conversion section 120 stops outputting the coordinate thus converted in the case in which the coordinate of the indication position calculated by the coordinate calculation section 114 is not included in the area where the image data is displayed, in other words, in the case in which the indication position is not included in the display image. In this case, the PC 300 can perform the operation corresponding only to the indication to the position overlapping the image.

11. Although in the embodiment described above the normalization of the coordinate (X1$n$, Y1$n$) and the coordinate (X2$n$, Y2$n$) is performed in the range equal to or higher than 0 and equal to or lower than 1, the method of normalization is not limited thereto. For the normalization of these coordinates, there can be used an arbitrary value (e.g., the range equal to or higher than 0 and equal to or lower than 32767) defined logically.

12. The display device according to the invention is not required to be a projector. For example, the display device according to the invention can also be a liquid crystal display. In this case, the constituent corresponding to the detector 14 can also be a digital still camera or the like, but can also be realized by a touch screen (a touch panel) disposed so as to overlap the display surface. Further, as the detection section 14, a variety of constituents well known to the public can be used besides the touch screen. It should be noted that in the case in which the display device according to the invention has the display surface itself, the operation such as the calibration described above becomes unnecessary.

13. Although in the embodiment described above the explanation is presented citing, as an example, the configuration in which the light modulation device 145 uses the three transmissive or reflective liquid crystal panels corresponding to the respective colors of RGB as means for modulating the light emitted by the light source, the invention is not limited thereto, but can be configured using a system including one liquid crystal panel and a color wheel combined with each other, a system using three digital mirror devices (DMD), a DMD system using one digital mirror device and a color wheel combined with each other, and so on. Here, in the case of using just one liquid crystal panel or DMD as the display section, the member corresponding to the combining optical system such as the cross dichroic prism is not necessary. Further, besides the liquid crystal panel or the DMD, any configuration capable of modulating the light emitted from the light source can be adopted without problems.

14. Further, it is also possible for the projector 100 to download the control program, which is stored in the storage section 180 in the embodiment described above, from another device connected via the communication network, and then execute the control program, or it is also possible to adopt the configuration of recording the control program on a portable recording medium, retrieving each of the programs from the recording medium, and then executing the program. The same can be applied to the display control program stored by the PC 300, and it is also possible for the PC 300 to download the display control program from another device and then execute the program, or it is possible to adopt the configuration in which the PC 300 retrieves the display control program stored in a portable recording medium, and then executes the program.

The entire disclosure of Japanese Patent Application No. 2012-1018, filed Jan. 6, 2012 is expressly incorporated by reference herein.

What is claimed is:

1. A display device comprising:
a function device connected to a host device in a manner compliant with a USB (Universal Serial Bus) standard, and having a first interface;
a storage section adapted to store a plurality of pieces of configuration information including first configuration information adapted to make a first pointing device correspond to an interface;
a display section adapted to display an image on a display surface;
a detector adapted to detect a first position indicated by a first indication body to the display surface;
a supply section adapted to assign the first configuration information stored in the storage section and first coordinate data representing the first position detected by the detector to the first interface, and supply the host device with the first configuration information and the first coordinate data via the function device;
a reception section adapted to receive an operation of a user; and
a change section adapted to change the configuration information corresponding to the first coordinate data in accordance with the operation received by the reception section.

2. The display device according to claim 1, wherein
the function device includes the first interface and a second interface,
the storage section stores the first configuration information, and second configuration information adapted to assign a second pointing device different from the first pointing device to an interface,
the change section changes the interface, to which the supply section supplies the first coordinate data, from the first interface to the second interface in accordance with the operation, and
the supply section assigns the second configuration information and the first coordinate data to the second interface, and supply the host device with the second configuration information and the first coordinate data via the function device.

3. The display device according to claim 1, wherein
the function device includes the first interface and a second interface,
the storage section stores the first configuration information, and second configuration information adapted to assign a second pointing device different from the first pointing device to an interface,
the detector detects the first position, and a second position indicated by a second indication body to the display surface,
the supply section assigns the first configuration information stored in the storage section and the first coordinate data representing the first position detected by the detector to the first interface and supplies the host device with the first configuration information and the first coordinate data via the function device, and assigns the second configuration information stored in the storage section and second coordinate data representing the second position detected by the detector to the second interface and supplies the host device with the second configuration information and the second coordinate data via the function device, and
the change section changes at least either of the first configuration information and the second configuration information supplied from the supply section in accordance with the operation received by the reception section.

4. The display device according to claim 1, wherein
the change section changes the configuration information so that a class of a device assigned to the first interface from one of a mouse and a digitizer to the other.

5. The display device according to claim 2, wherein
the storage section stores the configuration information, which assigns HID (Human Interface Device) class to the first interface and the second interface.

6. The display device according to claim 5, wherein
the storage section stores the configuration information, which assigns a sub-class corresponding to a mouse to the first interface, and assigns a sub-class corresponding to a digitizer to the second interface.

7. The display device according to claim 5, wherein
the storage section stores the configuration information, which assigns a sub-class corresponding to a mouse to the first interface and the second interface.

8. The display device according to claim 5, wherein
the storage section stores the configuration information, which assigns a sub-class corresponding to a digitizer to the first interface and the second interface.

9. The display device according to claim 1, wherein
the display section displays the image on the display surface by projecting light.

10. A display system comprising:
a display device including
- a function device connected to an external device in a manner compliant with a USB (Universal Serial Bus) standard, and having a first interface,
- a storage section adapted to store a plurality of pieces of configuration information including first configuration information adapted to make a first pointing device correspond to an interface,
- a display section adapted to display an image on a display surface,
- a detector adapted to detect a first position indicated by a first indication body to the display surface,
- a supply section adapted to assign the first configuration information stored in the storage section and first coordinate data representing the first position detected by the detector to the first interface, and supply the external device with the first configuration information and the first coordinate data via the function device,
- a reception section adapted to receive an operation of a user, and
- a change section adapted to change the configuration information corresponding to the first coordinate data in accordance with the operation received by the reception section; and a host device including
- an execution section connected to the display device in a manner compliant with the USB standard, and adapted to execute a process corresponding to the first position in accordance with the configuration information and the first coordinate data supplied via the function device.

11. The display system according to claim 10, wherein the execution section executes a process of making the display section draw an image corresponding to the first position.

12. A method of switching a device in a display device including
- a function device connected to a host device in a manner compliant with a USB (Universal Serial Bus) standard, and having a first interface,
- a storage section adapted to store a plurality of pieces of configuration information including first configuration information adapted to make a first pointing device correspond to an interface, and
- a display section adapted to display an image on a display surface, the method comprising:
- a first step of detecting a position indicated by an indication body to the display surface;
- a second step of assigning coordinate data representing the position detected in the first step and the configuration information stored in the storage section to the first interface, and supplying the host device with the coordinate data and the configuration information via the function device;
- a third step of receiving an operation of changing the configuration information, which is assigned to the first interface, from a user;
- a fourth step of changing the configuration information corresponding to the coordinate data from the coordinate data supplied in the second step in accordance with the operation received in the third step;
- a fifth step of detecting, after the change in the fourth step, a position indicated by the indication body to the display surface; and
- a sixth step of assigning coordinate data representing the position detected in the fifth step and the configuration information changed in the fourth step to the first interface, and supplying the host device with the coordinate data and the configuration information via the function device.

* * * * *